US010578882B2

(12) United States Patent
El-Ghoroury et al.

(10) Patent No.: US 10,578,882 B2
(45) Date of Patent: Mar. 3, 2020

(54) NON-TELECENTRIC EMISSIVE MICRO-PIXEL ARRAY LIGHT MODULATORS AND METHODS OF FABRICATION THEREOF

(71) Applicant: Ostendo Technologies, Inc., Carlsbad, CA (US)

(72) Inventors: Hussein S. El-Ghoroury, Carlsbad, CA (US); Mahesh Pitchumani, Carlsbad, CA (US); Zahir Y. Alpaslan, San Marcos, CA (US); Chih-Li Chuang, San Diego, CA (US); Dale A. McNeill, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 15/391,583

(22) Filed: Dec. 27, 2016

(65) Prior Publication Data
US 2017/0184776 A1 Jun. 29, 2017

Related U.S. Application Data

(60) Provisional application No. 62/271,637, filed on Dec. 28, 2015.

(51) Int. Cl.
*G02B 26/08* (2006.01)
*G02F 1/29* (2006.01)
(Continued)

(52) U.S. Cl.
CPC ......... *G02B 27/22* (2013.01); *G02B 27/0018* (2013.01); *H04N 13/30* (2018.05); *H04N 13/398* (2018.05)

(58) Field of Classification Search
CPC .. G02B 26/0841; G02B 26/001; G02B 26/02; G02B 26/08; G02B 26/0808;
(Continued)

(56) References Cited

U.S. PATENT DOCUMENTS

| 4,427,912 A | 1/1984 | Bui et al. |
| 4,987,410 A | 1/1991 | Berman et al. |

(Continued)

FOREIGN PATENT DOCUMENTS

| CN | 103298410 | 9/2013 |
| CN | 103546181 | 1/2014 |

(Continued)

OTHER PUBLICATIONS

"International Search Report and Written Opinion of the International Searching Authority dated Apr. 19, 2017; International Application No. PCT/US2016/069042", Apr. 19, 2017.

(Continued)

*Primary Examiner* — Brandi N Thomas
(74) *Attorney, Agent, or Firm* — Womble Bond Dickinson, LLP; W. Eric Boyd, Esq.

(57) ABSTRACT

Emissive micro-pixel spatial light modulators with non-telecentric emission are introduced. The individual light emission from each multi-color micro-scale emissive pixel is directionally modulated in a unique direction to enable application-specific non-telecentric emission pattern from the micro-pixel array of the emissive spatial light modulator. Design methods for directionally modulating the light emission of the individual micro-pixels using micro-pixel level optics are described. Monolithic wafer level optics methods for fabricating the micro-pixel level optics are also described. An emissive multi-color micro-pixel spatial light modulator with non-telecentric emission is used to exemplify the methods and possible applications of the present (Continued)

invention: ultra-compact image projector, minimal crosstalk 3D light field display, multi-view 2D display, and directionally modulated waveguide optics for see-through near-eye displays.

19 Claims, 27 Drawing Sheets

(51) Int. Cl.
  *G02B 26/00* (2006.01)
  *G02B 27/22* (2018.01)
  *G02B 27/00* (2006.01)
  *H04N 13/398* (2018.01)
  *H04N 13/30* (2018.01)

(58) Field of Classification Search
  CPC ............ G02B 26/0816; G02B 26/0833; G02B 27/0018; G02B 27/22; G02B 6/003; G02B 6/0046; G02B 6/0058
  USPC ........ 359/237, 242, 265–267, 270–273, 275, 359/290–292, 296, 298
  See application file for complete search history.

(56) References Cited

U.S. PATENT DOCUMENTS

| | | | |
|---|---|---|---|
| 5,162,828 A | 11/1992 | Furness et al. |
| 5,368,042 A | 11/1994 | O'Neal et al. |
| 5,619,373 A | 4/1997 | Meyerhofer et al. |
| 5,696,521 A | 12/1997 | Robinson et al. |
| 5,818,359 A | 10/1998 | Beach |
| 5,886,822 A | 3/1999 | Spitzer |
| 5,986,811 A | 11/1999 | Wohlstadter |
| 6,128,003 A | 10/2000 | Smith et al. |
| 6,147,807 A | 11/2000 | Droessler et al. |
| 6,151,167 A | 11/2000 | Melville |
| 6,353,503 B1 | 3/2002 | Spitzer et al. |
| 6,433,907 B1 | 8/2002 | Lippert et al. |
| 6,456,438 B1 | 9/2002 | Lee et al. |
| 6,522,794 B1 | 2/2003 | Bischel et al. |
| 6,529,331 B2 | 3/2003 | Massof et al. |
| 6,666,825 B2 | 12/2003 | Smith et al. |
| 6,710,902 B2 | 3/2004 | Takeyama |
| 6,719,693 B2 | 4/2004 | Richard |
| 6,795,221 B1 | 9/2004 | Urey |
| 6,803,561 B2 | 10/2004 | Dunfield |
| 6,804,066 B1 | 10/2004 | Ha et al. |
| 6,829,095 B2 | 12/2004 | Amitai |
| 6,924,476 B2 | 8/2005 | Wine et al. |
| 6,937,221 B2 | 8/2005 | Lippert et al. |
| 6,984,208 B2 | 1/2006 | Zheng |
| 6,999,238 B2 | 2/2006 | Glebov et al. |
| 7,061,450 B2 | 6/2006 | Bright et al. |
| 7,071,594 B1 | 7/2006 | Yan et al. |
| 7,106,519 B2 | 9/2006 | Aizenberg et al. |
| 7,190,329 B2 | 3/2007 | Lewis et al. |
| 7,193,758 B2 | 3/2007 | Wiklof et al. |
| 7,209,271 B2 | 4/2007 | Lewis et al. |
| 7,215,475 B2 | 5/2007 | Woodgate et al. |
| 7,232,071 B2 | 6/2007 | Lewis et al. |
| 7,369,321 B1 | 5/2008 | Ren et al. |
| 7,482,730 B2 | 1/2009 | Davis et al. |
| 7,486,255 B2 | 2/2009 | Brown et al. |
| 7,545,571 B2 | 6/2009 | Garoutte et al. |
| 7,580,007 B2 | 8/2009 | Brown et al. |
| 7,619,807 B2 | 11/2009 | Baek et al. |
| 7,623,560 B2 | 11/2009 | El-Ghoroury et al. |
| 7,724,210 B2 | 5/2010 | Sprague et al. |
| 7,747,301 B2 | 6/2010 | Cheng et al. |
| 7,767,479 B2 | 8/2010 | El-Ghoroury et al. |
| 7,791,810 B2 | 9/2010 | Powell |
| 7,829,902 B2 | 11/2010 | El-Ghoroury et al. |
| 7,952,809 B2 | 5/2011 | Takai |
| 8,049,231 B2 | 11/2011 | El-Ghoroury et al. |
| 8,098,265 B2 | 1/2012 | El-Ghoroury et al. |
| 8,243,770 B2 | 8/2012 | El-Ghoroury et al. |
| 8,279,716 B1 | 10/2012 | Gossweiler, III et al. |
| 8,292,833 B2 | 10/2012 | Son et al. |
| 8,405,618 B2 | 3/2013 | Colgate et al. |
| 8,471,967 B2 | 6/2013 | Miao et al. |
| 8,477,425 B2 | 7/2013 | Border et al. |
| 8,482,859 B2 | 7/2013 | Border |
| 8,508,830 B1 | 8/2013 | Wang |
| 8,508,851 B2 | 8/2013 | Miao et al. |
| 8,510,244 B2 | 8/2013 | Carson et al. |
| 8,553,910 B1 | 10/2013 | Dong et al. |
| 8,567,960 B2 | 10/2013 | El-Ghoroury et al. |
| 8,619,049 B2 | 12/2013 | Harrison et al. |
| 8,725,842 B2 | 5/2014 | Al-Nasser |
| 8,743,145 B1 | 6/2014 | Price |
| 8,773,599 B2 | 7/2014 | Saeedi et al. |
| 8,854,724 B2 | 10/2014 | El-Ghoroury et al. |
| 8,928,969 B2 | 1/2015 | Alpaslan et al. |
| 8,975,713 B2 | 3/2015 | Sako et al. |
| 9,097,890 B2 | 8/2015 | Miller et al. |
| 9,110,504 B2 | 8/2015 | Lewis et al. |
| 9,134,535 B2 | 9/2015 | Dobschal et al. |
| 9,179,126 B2 | 11/2015 | El-Ghoroury et al. |
| 9,195,053 B2 | 11/2015 | El-Ghoroury et al. |
| 9,239,453 B2 | 1/2016 | Cheng et al. |
| 9,244,277 B2 | 1/2016 | Cheng et al. |
| 9,244,539 B2 | 1/2016 | Venable et al. |
| 9,274,608 B2 | 3/2016 | Katz et al. |
| 9,286,730 B2 | 3/2016 | Bar-Zeev et al. |
| 9,529,191 B2 | 12/2016 | Sverdrup et al. |
| 9,538,182 B2 | 1/2017 | Mishourovsky et al. |
| 9,681,069 B2 | 6/2017 | El-Ghoroury et al. |
| 9,712,764 B2 | 7/2017 | El-Ghoroury et al. |
| 9,774,800 B2 | 9/2017 | El-Ghoroury et al. |
| 9,779,515 B2 | 10/2017 | El-Ghoroury et al. |
| 9,965,982 B2 | 5/2018 | Lapstun |
| 2002/0008854 A1 | 1/2002 | Leigh Travis |
| 2002/0017567 A1 | 2/2002 | Connolly et al. |
| 2002/0024495 A1 | 2/2002 | Lippert et al. |
| 2002/0075232 A1 | 6/2002 | Daum et al. |
| 2002/0083164 A1 | 6/2002 | Katayama et al. |
| 2002/0141026 A1 | 10/2002 | Wiklof et al. |
| 2002/0158814 A1 | 10/2002 | Bright et al. |
| 2002/0181115 A1 | 12/2002 | Massof et al. |
| 2002/0194005 A1 | 12/2002 | Lahr |
| 2003/0032884 A1 | 2/2003 | Smith et al. |
| 2003/0086135 A1 | 5/2003 | Takeyama |
| 2003/0122066 A1 | 7/2003 | Dunfield |
| 2003/0138130 A1 | 7/2003 | Cohen et al. |
| 2003/0184575 A1 | 10/2003 | Reho et al. |
| 2003/0187357 A1 | 10/2003 | Richard |
| 2004/0004585 A1 | 1/2004 | Brown et al. |
| 2004/0024312 A1 | 2/2004 | Zheng |
| 2004/0051392 A1 | 3/2004 | Badarneh |
| 2004/0080807 A1* | 4/2004 | Chen ................ G02B 26/0808 359/291 |
| 2004/0080938 A1 | 4/2004 | Holman et al. |
| 2004/0085261 A1 | 5/2004 | Lewis et al. |
| 2004/0119004 A1 | 6/2004 | Wine et al. |
| 2004/0125076 A1 | 7/2004 | Green |
| 2004/0138935 A1 | 7/2004 | Johnson et al. |
| 2004/0179254 A1 | 9/2004 | Lewis et al. |
| 2004/0240064 A1 | 12/2004 | Dutta |
| 2005/0002074 A1 | 1/2005 | McPheters et al. |
| 2005/0024730 A1 | 2/2005 | Aizenberg et al. |
| 2005/0053192 A1 | 3/2005 | Sukovic et al. |
| 2005/0116038 A1 | 6/2005 | Lewis et al. |
| 2005/0117195 A1 | 6/2005 | Glebov et al. |
| 2005/0168700 A1 | 8/2005 | Berg et al. |
| 2005/0179976 A1 | 8/2005 | Davis et al. |
| 2005/0264502 A1 | 12/2005 | Sprague et al. |
| 2006/0017655 A1 | 1/2006 | Brown et al. |
| 2006/0132383 A1 | 6/2006 | Gally et al. |
| 2006/0152812 A1 | 7/2006 | Woodgate et al. |
| 2006/0253007 A1 | 11/2006 | Cheng et al. |
| 2006/0285192 A1* | 12/2006 | Yang ................ G02B 26/0841 359/291 |

(56) References Cited

U.S. PATENT DOCUMENTS

| | | |
|---|---|---|
| 2006/0290663 A1 | 12/2006 | Mitchell |
| 2007/0052694 A1 | 3/2007 | Holmes |
| 2007/0083120 A1 | 4/2007 | Cain et al. |
| 2007/0236450 A1 | 10/2007 | Colgate et al. |
| 2007/0269432 A1 | 11/2007 | Nakamura et al. |
| 2007/0276658 A1 | 11/2007 | Douglass |
| 2008/0002262 A1 | 1/2008 | Chirieleison |
| 2008/0049291 A1 | 2/2008 | Baek et al. |
| 2008/0130069 A1 | 6/2008 | Cernasov |
| 2008/0141316 A1 | 6/2008 | Igoe et al. |
| 2008/0239452 A1 | 10/2008 | Xu et al. |
| 2009/0073559 A1 | 3/2009 | Woodgate et al. |
| 2009/0086170 A1 | 4/2009 | El-Ghoroury et al. |
| 2009/0096746 A1 | 4/2009 | Kruse et al. |
| 2009/0161191 A1 | 6/2009 | Powell |
| 2009/0199900 A1 | 8/2009 | Bita et al. |
| 2009/0222113 A1 | 9/2009 | Fuller et al. |
| 2009/0256287 A1 | 10/2009 | Fu et al. |
| 2009/0268303 A1 | 10/2009 | Takai |
| 2009/0278998 A1 | 11/2009 | El-Ghoroury et al. |
| 2009/0327171 A1 | 12/2009 | Tan et al. |
| 2010/0003777 A1 | 1/2010 | El-Ghoroury et al. |
| 2010/0026960 A1 | 2/2010 | Sprague |
| 2010/0046070 A1 | 2/2010 | Mukawa |
| 2010/0053164 A1 | 3/2010 | Imai et al. |
| 2010/0066921 A1 | 3/2010 | El-Ghoroury et al. |
| 2010/0091050 A1 | 4/2010 | El-Ghoroury et al. |
| 2010/0156676 A1 | 6/2010 | Mooring et al. |
| 2010/0171922 A1 | 7/2010 | Sessner et al. |
| 2010/0199232 A1 | 8/2010 | Mistry et al. |
| 2010/0220042 A1 | 9/2010 | El-Ghoroury et al. |
| 2010/0241601 A1 | 9/2010 | Carson et al. |
| 2010/0245957 A1 | 9/2010 | Hudman et al. |
| 2010/0259472 A1 | 10/2010 | Radivojevic et al. |
| 2010/0267449 A1 | 10/2010 | Gagner et al. |
| 2011/0054360 A1 | 3/2011 | Son et al. |
| 2011/0115887 A1 | 5/2011 | Yoo et al. |
| 2011/0221659 A1 | 9/2011 | King, III et al. |
| 2011/0285666 A1 | 11/2011 | Poupyrev et al. |
| 2011/0285667 A1 | 11/2011 | Poupyrev et al. |
| 2012/0033113 A1 | 2/2012 | El-Ghoroury et al. |
| 2012/0075173 A1 | 3/2012 | Ashbrook et al. |
| 2012/0075196 A1 | 3/2012 | Ashbrook et al. |
| 2012/0105310 A1 | 5/2012 | Sverdrup et al. |
| 2012/0113097 A1 | 5/2012 | Nam et al. |
| 2012/0120498 A1 | 5/2012 | Harrison et al. |
| 2012/0143358 A1 | 6/2012 | Adams et al. |
| 2012/0154441 A1 | 6/2012 | Kim |
| 2012/0157203 A1 | 6/2012 | Latta et al. |
| 2012/0195461 A1 | 8/2012 | Lawrence Ashok Inigo |
| 2012/0212398 A1 | 8/2012 | Border et al. |
| 2012/0212399 A1 | 8/2012 | Border et al. |
| 2012/0218301 A1 | 8/2012 | Miller |
| 2012/0236201 A1 | 9/2012 | Larsen et al. |
| 2012/0249409 A1 | 10/2012 | Toney et al. |
| 2012/0249741 A1 | 10/2012 | Maciocci et al. |
| 2012/0288995 A1 | 11/2012 | El-Ghoroury et al. |
| 2012/0290943 A1 | 11/2012 | Toney et al. |
| 2012/0293402 A1 | 11/2012 | Harrison et al. |
| 2012/0299962 A1 | 11/2012 | White et al. |
| 2012/0319940 A1 | 12/2012 | Bress et al. |
| 2012/0320092 A1 | 12/2012 | Shin et al. |
| 2013/0016292 A1 | 1/2013 | Miao et al. |
| 2013/0021658 A1 | 1/2013 | Miao et al. |
| 2013/0027341 A1 | 1/2013 | Mastandrea |
| 2013/0041477 A1 | 2/2013 | Sikdar et al. |
| 2013/0050260 A1 | 2/2013 | Reitan |
| 2013/0080890 A1 | 3/2013 | Krishnamurthi |
| 2013/0083303 A1 | 4/2013 | Hoover et al. |
| 2013/0100362 A1 | 4/2013 | Saeedi et al. |
| 2013/0141895 A1 | 6/2013 | Alpaslan et al. |
| 2013/0162505 A1 | 6/2013 | Crocco et al. |
| 2013/0169536 A1 | 7/2013 | Wexler et al. |
| 2013/0176622 A1 | 7/2013 | Abrahamsson et al. |
| 2013/0187836 A1 | 7/2013 | Cheng et al. |
| 2013/0196757 A1 | 8/2013 | Latta et al. |
| 2013/0215516 A1 | 8/2013 | Dobschal et al. |
| 2013/0225999 A1 | 8/2013 | Banjanin et al. |
| 2013/0258451 A1* | 10/2013 | El-Ghoroury ........ G02B 26/101 359/298 |
| 2013/0271679 A1 | 10/2013 | Sakamoto et al. |
| 2013/0285174 A1 | 10/2013 | Sako et al. |
| 2013/0286053 A1 | 10/2013 | Fleck et al. |
| 2013/0286178 A1 | 10/2013 | Lewis et al. |
| 2013/0321581 A1 | 12/2013 | El-Ghoroury et al. |
| 2014/0009845 A1 | 1/2014 | Cheng et al. |
| 2014/0024132 A1 | 1/2014 | Jia et al. |
| 2014/0049417 A1 | 2/2014 | Abdurrahman et al. |
| 2014/0049983 A1 | 2/2014 | Nichol et al. |
| 2014/0055352 A1 | 2/2014 | David et al. |
| 2014/0055692 A1 | 2/2014 | Kroll et al. |
| 2014/0085177 A1 | 3/2014 | Lyons et al. |
| 2014/0091984 A1 | 4/2014 | Ashbrook et al. |
| 2014/0098018 A1 | 4/2014 | Kim et al. |
| 2014/0098067 A1 | 4/2014 | Yang et al. |
| 2014/0118252 A1 | 5/2014 | Kim et al. |
| 2014/0129207 A1 | 5/2014 | Bailey et al. |
| 2014/0139454 A1 | 5/2014 | Mistry et al. |
| 2014/0139576 A1 | 5/2014 | Costa et al. |
| 2014/0147035 A1 | 5/2014 | Ding et al. |
| 2014/0168062 A1 | 6/2014 | Katz et al. |
| 2014/0176417 A1 | 6/2014 | Young et al. |
| 2014/0185142 A1 | 7/2014 | Gupta et al. |
| 2014/0200496 A1 | 7/2014 | Hyde et al. |
| 2014/0232651 A1 | 8/2014 | Kress et al. |
| 2014/0292620 A1 | 10/2014 | Lapstun |
| 2014/0300869 A1* | 10/2014 | Hirsch ............... G02B 27/2214 353/7 |
| 2014/0301662 A1 | 10/2014 | Justice et al. |
| 2014/0304646 A1 | 10/2014 | Rossmann |
| 2014/0340304 A1 | 11/2014 | Dewan et al. |
| 2015/0001987 A1 | 1/2015 | Masaki et al. |
| 2015/0033539 A1 | 2/2015 | El-Ghoroury et al. |
| 2015/0035832 A1 | 2/2015 | Sugden et al. |
| 2015/0054729 A1 | 2/2015 | Minnen et al. |
| 2015/0058102 A1 | 2/2015 | Christensen et al. |
| 2015/0125109 A1 | 5/2015 | Robbins et al. |
| 2015/0138086 A1 | 5/2015 | Underkoffler et al. |
| 2015/0148886 A1 | 5/2015 | Rao et al. |
| 2015/0193984 A1 | 7/2015 | Bar-Zeev et al. |
| 2015/0205126 A1 | 7/2015 | Schowengerdt |
| 2015/0220109 A1 | 8/2015 | von Badinski et al. |
| 2015/0235467 A1 | 8/2015 | Schowengerdt et al. |
| 2015/0277126 A1 | 10/2015 | Hirano et al. |
| 2015/0301256 A1 | 10/2015 | Takiguchi |
| 2015/0301383 A1 | 10/2015 | Kimura |
| 2015/0323990 A1 | 11/2015 | Maltz |
| 2015/0323998 A1 | 11/2015 | Kudekar et al. |
| 2015/0326842 A1 | 11/2015 | Huai |
| 2015/0381782 A1 | 12/2015 | Park |
| 2016/0018948 A1 | 1/2016 | Parvarandeh et al. |
| 2016/0026059 A1 | 1/2016 | Chung et al. |
| 2016/0028935 A1 | 1/2016 | El-Ghoroury et al. |
| 2016/0116738 A1 | 4/2016 | Osterhout |
| 2016/0182782 A1 | 6/2016 | El-Ghoroury et al. |
| 2016/0191765 A1 | 6/2016 | El-Ghoroury et al. |
| 2016/0191823 A1 | 6/2016 | El-Ghoroury et al. |
| 2016/0220232 A1 | 8/2016 | Takada et al. |
| 2016/0342151 A1 | 11/2016 | Dey, IV et al. |
| 2017/0065872 A1 | 3/2017 | Kelley |
| 2017/0069134 A1 | 3/2017 | Shapira et al. |
| 2017/0116897 A1 | 4/2017 | Ahn et al. |
| 2017/0184776 A1 | 6/2017 | El-Ghoroury et al. |
| 2017/0236295 A1 | 8/2017 | El-Ghoroury |
| 2017/0261388 A1 | 9/2017 | Ma et al. |
| 2017/0310956 A1 | 10/2017 | Perdices-Gonzalez et al. |

FOREIGN PATENT DOCUMENTS

| | | |
|---|---|---|
| CN | 103558918 | 2/2014 |
| CN | 104460992 | 3/2015 |

(56) References Cited

FOREIGN PATENT DOCUMENTS

| EP | 0431488 | 1/1996 |
|---|---|---|
| WO | WO-2014/124173 | 8/2014 |

OTHER PUBLICATIONS

"International Search Report and Written Opinion of the International Searching Authority dated Jun. 29, 2017; International Application No. PCT/US2017/026238", Jun. 29, 2017.

"Invitation to Pay Additional Fees dated Feb. 13, 2017; International Application No. PCT/US2016/069042", Feb. 13, 2017.

Fattal, David et al., "A multi-directional backlight for a wide-angle, glasses-free three-dimensional display", Nature, vol. 495, Mar. 21, 2013, pp. 348-351.

Grossberg, Stephen et al., "Neural dynamics of saccadic and smooth pursuit eye movement coordination during visual tracking of unpredictably moving targets", Neural Networks, vol. 27, 2012, pp. 1-20.

Hua, Hong et al., "A 3D integral imaging optical see-through head-mounted display", Optics Express, vol. 22, No. 11, May 28, 2014, pp. 13484-13491.

Lanman, Douglas et al., "Near-Eye Light Field Displays", ACM Transactions on Graphics (TOC), vol. 32, Issue 6, Article 220, Nov. 2013, 27 pp. total.

Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.

Rolland, Jannick P. et al., "Dynamic focusing in head-mounted displays", Part of the IS&T/SPIE Conference on the Engineering Reality of Virtual Reality, SPIE vol. 3639, Jan. 1999, pp. 463-470.

Wikipedia, , "List of refractive indices", https://en.wikipedia.org/wiki/List_of_refractive_indices, Dec. 7, 2003, 5 pp. total.

Ahumada, Jr., Albert J. et al., "Spatio-temporal discrimination model predicts temporal masking functions", Proceedings of SPIE—the International Society for Optical Engineering, Human vision and electronic imaging III, vol. 3299, 1998, 6 pp. total.

Beulen, Bart W. et al., "Toward Noninvasive Blood Pressure Assessment in Arteries by Using Ultrasound", Ultrasound in Medicine & Biology, vol. 37, No. 5, 2011, pp. 788-797.

Bickel, Bernd et al., "Capture and Modeling of Non-Linear Heterogeneous Soft Tissue", ACM Transactions on Graphics (TOG)—Proceedings of ACM SIGGRAPH 2009, vol. 28, Issue 3, Article No. 89, Aug. 2009, 9 pp. total.

Castellini, Claudio et al., "Using Ultrasound Images of the Forearm to Predict Finger Positions", IEEE Transactions on Neural Systems and Rehabilitation Engineering, vol. 20, No. 6, Nov. 2012, pp. 788-797.

Cobbold, Richard S. , "Foundations of Biomedical Ultrasound", Oxford University Press, 2007, pp. 3-95.

Guo, Jing-Yi et al., "Dynamic monitoring of forearm muscles using one-dimensional sonomyography system", Journal of Rehabilitation Research & Development, vol. 45, No. 1, 2008, pp. 187-195.

Harrison, Chris et al., "Skinput: Appropriating the Body as an Input Surface", CHI '10 Proceedings of the SIGCHI Conference on Human Factors in Computing Systems, 2010, pp. 453-462.

Hsiao, Tzu-Yu et al., "Noninvasive Assessment of Laryngeal Phonation Function Using Color Doppler Ultrasound Imaging", Ultrasound in Med. & Biol., vol. 27, No. 8, 2001, pp. 1035-1040.

Keir, Peter J. et al., "Changes in geometry of the finger flexor tendons in the carpal tunnel with wrist posture and tendon load: an MRI study on normal wrists", Clinical Biomechanics, vol. 14, 1999, pp. 635-645.

Khuri-Yakub, Butrus T. et al., "Capacitive micromachined ultrasonic transducers for medical imaging and therapy", J. Micromech. Microeng., vol. 21, No. 5, May 2011, pp. 054004-054014.

Koutsouridis, G. G. et al., "Towards a Non-Invasive Ultrasound Pressure Assessment in Large Arteries", Technische Universiteit Eindhoven, University of Technology, Mate Poster Award 2010 : 15th Annual Poster Contest, 2010, 1 page total.

Legros, M. et al., "Piezocomposite and CMUT Arrays Assessment Through In Vitro Imaging Performances", 2008 IEEE Ultrasonics Symposium, Nov. 2-5, 2008, pp. 1142-1145.

Martin, Joel R. et al., "Changes in the flexor digitorum profundus tendon geometry in the carpal tunnel due to force production and posture of metacarpophalangeal joint of the index finger: An MRI study", Clinical Biomechanics, vol. 28, 2013, pp. 157-163.

Martin, Joel R. et al., "Effects of the index finger position and force production on the flexor digitorum superficialis moment arms at the metacarpophalangeal joints—a magnetic resonance imaging study", Clinical Biomechanics, vol. 27, 2012, pp. 453-459.

Mujibiya, Adiyan et al., "The Sound of Touch: On-body Touch and Gesture Sensing Based on Transdermal Ultrasound Propagation", ITS '13 Proceedings of the 2013 ACM international conference on Interactive tabletops and surfaces, Oct. 6-9, 2013, pp. 189-198.

Paclet, Florent et al., "Motor control theories improve biomechanical model of the hand for finger pressing tasks", Journal of Biomechanics, vol. 45, 2012, pp. 1246-1251.

Pinton, Gianmarco F. et al., "A Heterogeneous Nonlinear Attenuating Full-Wave Model of Ultrasound", IEEE Transactions on Ultrasonics, Ferroelectrics, and Frequency Control, vol. 56, No. 3, Mar. 2009, pp. 474-488.

Richard, William D. et al., "A scalable architecture for real-time synthetic-focus imaging", Ultrasonic Imaging, vol. 25, 2003, pp. 151-161.

Shi, Jun et al., "Feasibility of controlling prosthetic hand using sonomyography signal in real time: Preliminary study", Journal of Rehabilitation Research & Development, vol. 47, No. 2, 2010, pp. 87-97.

Sikdar, Siddhartha et al., "Novel Method for Predicting Dexterous Individual Finger Movements by Imaging Muscle Activity Using a Wearable Ultrasonic System", IEEE Transactions on Neural Systems and Rehabilitation Engineering, vol. 22, No. 1, Jan. 2014, pp. 69-76.

Sueda, Shinjiro et al., "Musculotendon Simulation for Hand Animation", ACM Transactions on Graphics (TOG)—Proceedings of ACM SIGGRAPH 2008, vol. 27 Issue 3, Article No. 83, vol. 27 Issue 3, Aug. 2008, 8 pp. total.

Szabo, Thomas L. , "Diagnostic Ultrasound Imaging: Inside Out, Second Edition", Elsevier Inc., 2013, 829 pp. total.

Van Den Branden Lambrecht, Christian J. , "A Working Spatio-Temporal Model of the Human Visual System for Image Restoration and Quality Assessment Applications", ICASSP-96, Conference Proceedings of the 1996 IEEE International Conference on Acoustics, Speech, and Signal Processing, May 1996, 4 pp. total.

Watson, Andrew B. et al., "Model of human visual-motion sensing", Journal of the Optical Society of America A, vol. 2, No. 2, Feb. 1985, pp. 322-342.

Watson, Andrew B. et al., "Model of visual contrast gain control and pattern masking", Journal of the Optical Society of America A, vol. 14, No. 9, Sep. 1997, pp. 2379-2391.

Watson, Andrew B. , "The search for optimal visual stimuli", Vision Research, vol. 38, 1998, pp. 1619-1621.

Watson, Andrew B. , "The Spatial Standard Observer: A Human Visual Model for Display Inspection", Society for Information Display, SID 06 Digest, Jun. 2006, pp. 1312-1315.

Watson, Andrew B. , "Visual detection of spatial contrast patterns: Evaluation of five simple models", Optics Express, vol. 6, No. 1, Jan. 3, 2000, pp. 12-33.

Williams III, T. W. , "Progress on stabilizing and controlling powered upper-limb prostheses", Journal of Rehabilitation Research & Development, Guest Editorial, vol. 48, No. 6, 2011, pp. ix-xix.

Willis, Karl D. et al., "MotionBeam: A Metaphor for Character Interaction with Handheld Projectors", CHI '11 Proceedings of the SIGCHI Conference on Human Factors in Computing Systems, May 7-12, 2011, pp. 1031-1040.

Yun, Xiaoping et al., "Design, Implementation, and Experimental Results of a Quaternion-Based Kalman Filter for Human Body Motion Tracking", IEEE Transactions on Robotics, vol. 22, No. 6, Dec. 2006, pp. 1216-1227.

(56) References Cited

OTHER PUBLICATIONS

Zhang, Cha et al., "Maximum Likelihood Sound Source Localization and Beamforming for Directional Microphone Arrays in Distributed Meetings", IEEE Transactions on Multimedia, vol. 10, No. 3, Apr. 2008, pp. 538-548.

* cited by examiner

*FIG. 1E*
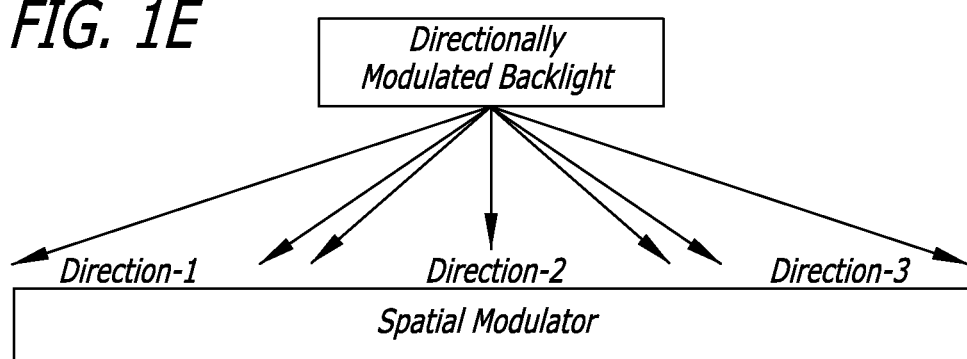
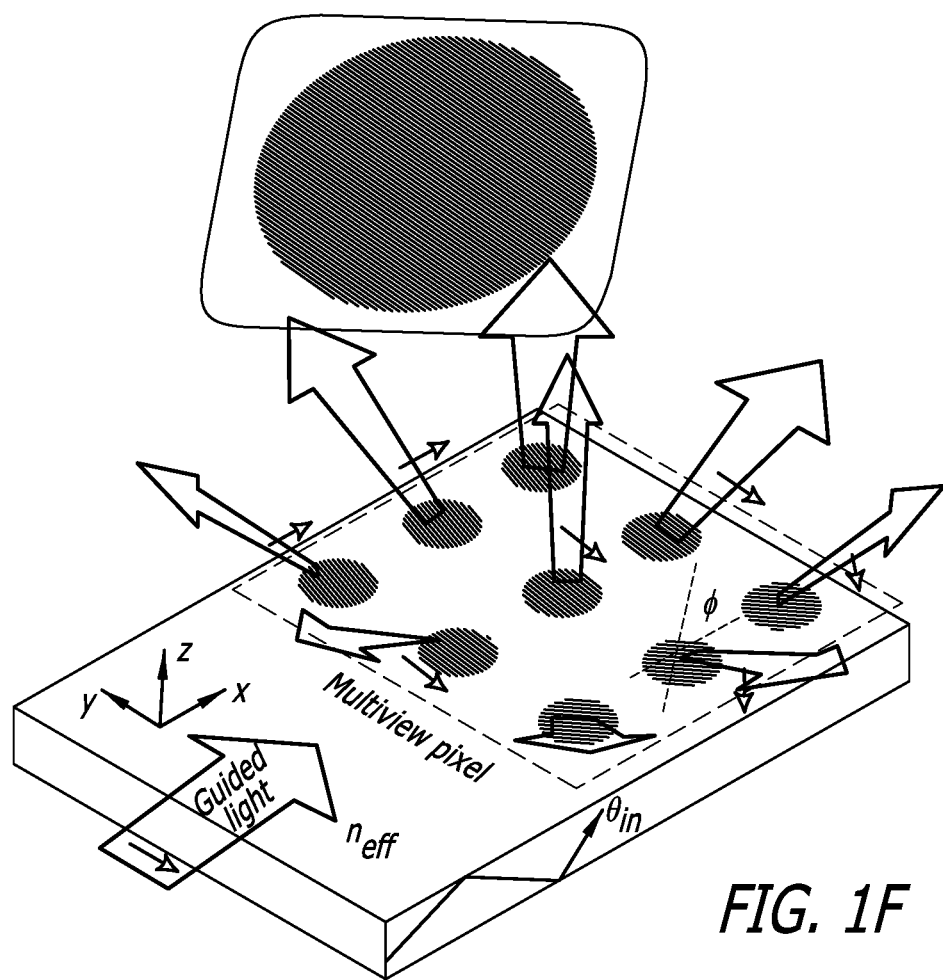
*FIG. 1F*

FIG. 2D-2
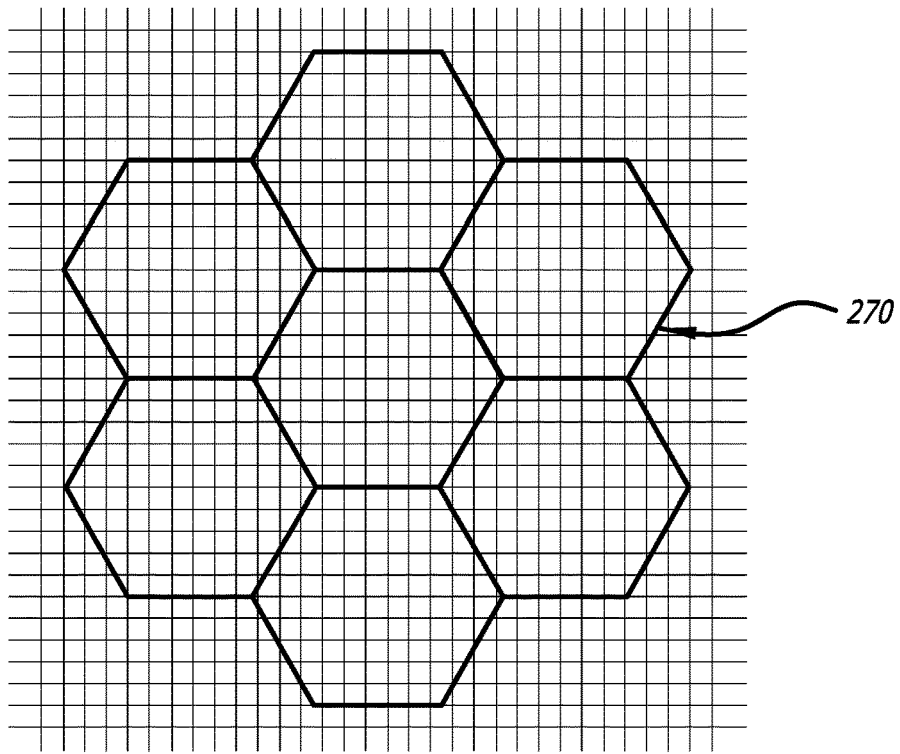
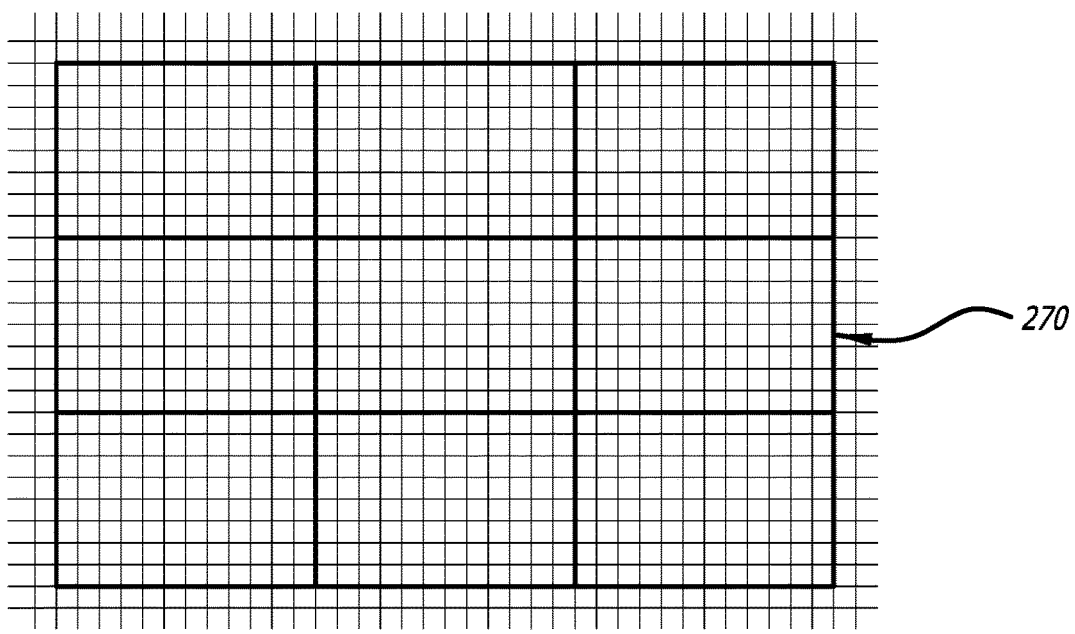
FIG. 2D-3

NON-TELECENTRIC EMISSIVE MICRO-PIXEL ARRAY LIGHT MODULATORS AND METHODS OF FABRICATION THEREOF

CROSS-REFERENCE TO RELATED APPLICATIONS

This application claims the benefit of U.S. Provisional Patent Application No. 62/271,637 filed Dec. 28, 2015.

BACKGROUND OF THE INVENTION

1. Field of the Invention

Non-telecentric emission spatial light modulators, emissive micro-pixel displays, ultra-compact image projectors, directional light modulators, multi-view 2D displays, 3D displays, near-eye displays, head-up displays.

2. Prior Art

Spatial light modulators (SLMs) are a class of optoelectronic devices having a planar array of micro-scale pixels that are typically used as an image source in display systems. Such light modulators typically fall in one of three distinctive categories: reflective, transmissive or emissive. Examples of reflective SLMs include micro mirror array devices and liquid crystal on silicon (LCoS) devices. Examples of transmissive SLMs include high temperature poly-silicon liquid crystal (HTPS) devices. Examples of emissive SLMs include emissive micro-pixel array devices. One example of an emissive micro-pixel array device may be based on the Quantum Photonic Imager or QPI® imager described in U.S. Pat. Nos. 7,623,560, 7,767,479, 7,829,902, 8,049,231, 8,243,770 and 8,567,960 and organic light emitting diode (OLED) micro-pixel array devices. Both reflective and transmissive SLMs typically require an external light source to modulate images while an emissive SLM generates its own light. In general, all current categories of SLMs modulate telecentric light; meaning the modulated light bundles have their chief rays perpendicular to the plane of the light modulator pixel array. In the case of reflective and transmissive SLMs, telecentric light modulation is dictated by the design limitations of their external light source. Telecentric light emission is the only option available for emissive SLMs with a Lambertian emission profile such as OLED based SLMs.

Example micro-emissive solid state light-emitting display elements suitable for use with the embodiments herein include, without limitation, those described in U.S. Pat. Nos. 7,623,560, 7,767,479, 7,829,902, 8,049,231, 8,243,770 and 8,567,960. These SSL imagers feature high brightness, in a multi-color emissive micro-pixel spatial array with all of its needed drive circuitry in a single device. Within the context of this disclosure the term "SSL imager" is henceforth intended to mean an optoelectronics device that comprises an array of emissive micro-scale solid state light (SSL) emitting pixels. The SSL light emitting pixels of such an imager, hereinafter referred to as simply SSL imagers, are typically either a light emitting diode (LED) or laser diode (LD) whose on-off state is controlled by the drive circuitry contained within a CMOS device upon which the emissive micro-scale pixel array is formed or bonded. The pixels within the emissive micro-scale pixel array of an SSL imager are individually addressable through its drive circuitry, such as CMOS or the comparable, enabling an SSL imager to emit light that is modulated spatially, chromatically and temporally. The multiple colors emitted by an SSL imager share the same pixel optical aperture. In an SSL imager best suited for use with the embodiments herein, each SSL imager pixel emits at least partially collimated (or non-Lambertian) light, in the case of a QPI SSL imager, with an angle of divergence ranging, by design, from ±5° to ±45°. The size of the pixels comprising the emissive array of an SSL imager would typically be in the range of approximately 5-20 microns with the typical emissive surface area of the device being in the range of approximately 15-150 square millimeter. An SSL imager preferably can be designed with minimal gap between its emissive pixel array area and the device physical edge, allowing a multiplicity of SSL imagers, including QPI imagers, to be tiled to create any arbitrary size emissive display area.

Although all current categories of SLMs preferably modulate telecentric light, there is much to be gained from a non-telecentric light emission SLM. Since reflective and transmissive SLM's non-telecentric light modulation capability is limited by their external light source, and an emissive OLED-based SLM cannot achieve non-telecentric light emission by virtue of its Lambertian light emission profile, the SSL imager with its emissive multi-color micro-pixels that emits collimated (or non-Lambertian) light is uniquely qualified to achieve non-telecentric light modulation. It is therefore an objective of this invention to extend the design and manufacturing methods of an SSL imager to include the capability of non-telecentric light emission for the numerous possible applications that stand to benefit from such capability, some few of which are described herein by way of non-limiting examples only.

FIG. 1A illustrates the prior art design concept of a projection display that uses a telecentric light emission SLM. As illustrated in FIG. 1A, the divergence pattern of the light bundles 105 emitted from the telecentric emission SLM 110 dictates the use of a large diameter projection optics 115 which typically dictates the large optical track length 120, which in turn makes the overall design of a projection system that uses the telecentric emission SLM 110 overly bulky. It is therefore one of the objectives of this invention to introduce non-telecentric emission SLM methods that enable smaller diameter projection optics, and consequently achieve shorter optical track lengths and a substantially more compact overall projection system.

FIG. 1B illustrates the prior art designs of a 3D light field display that uses a telecentric light emission SLM, for example U.S. Pat. Nos. 8,928,969, 8,854,724 and 9,195,053. In these types of displays, an array of lenses (130-132) are used whereby each of these lenses (130 for example) directionally modulates the light emitted from the sub-array of the SLM micro pixels 115 to subtend into a unique set of directions depending on the spatial position of each pixel within the sub-array of pixels. As illustrated in FIG. 1B, the divergence pattern of the telecentric light bundles 135 emitted from the pixels at the boundaries of each lens (130 for example) corresponding pixel sub-array would partially illuminate the adjacent lenses (131 and 132 for example). This effect, which is often referred to as "cross-talk", causes undesirable "ghost" distortions in the directionally modulated 3D image. It is therefore another objective of this invention to introduce non-telecentric emission SLM methods that enable a 3D light field display exhibiting minimal cross-talk image distortion.

In the design of 3D displays, directional modulation of the emitted light is necessary to create the 3D viewing perception. In a typical 3D display, a backlight with uniform illumination in multiple illumination directions is required to display images of the same scene from different directions by utilizing some combination of spatial multiplexing and temporal multiplexing in the SLM. In these 3D displays, the light that typically comes from the directional backlight is usually processed by a directionally selective filter (such as diffractive plate or a holographic optical plate for example FIG. 1D, U.S. Pat. No. 7,952,809) before it reaches the spatial light modulator pixels that modulate the light color and intensity while keeping its directionality.

Currently, prior art directional light modulators are a combination of an illumination unit comprising multiple light sources and a directional modulation unit that directs the light emitted by the light sources to a designated direction (see FIG. 1D, 1E & 1F). As illustrated in FIG. 1A, 1B & 1C which depict several variants of the prior art, an illumination unit is usually combined with an electro-mechanical movement device such as scanning mirrors, a rotating barriers (see U.S. Pat. Nos. 6,151,167, 6,433,907, 6,795,221, 6,803,561, 6,924,476, 6,937,221, 7,061,450, 7,071,594, 7,190,329, 7,193,758, 7,209,271, 7,232,071, 7,482,730, 7,486,255, 7,580,007, 7,724,210, 7,791,810 and U.S. Patent Application Publication Nos. 2010/0026960 and 2010/0245957), or electro-optically such as liquid lenses or polarization switching (see U.S. Pat. Nos. 5,986,811, 6,999, 238, 7,106,519, 7,215,475, 7,369,321, 7,619,807, 7,952,809 and FIG. 1A, 1B & 1C).

In addition to being slow, bulky and optically lossy, the prior art directional backlight units typically need to have narrow spectral bandwidth, high collimation and individual controllability for being combined with a directionally selective filter for 3D display purposes. Achieving narrow spectral bandwidth and high collimation requires device level innovations and optical light conditioning, increasing the cost and the volumetric aspects of the overall display system. Achieving individual controllability requires additional circuitry and multiple light sources, increasing the system complexity, bulk and cost. It is therefore an objective of this invention to introduce directional light modulators that overcome the limitation of the prior art, thus making it feasible to create distortion free 3D and multi-view 2D displays that provide the volumetric advantages plus a viewing experience over a wide viewing angle.

Additional objectives and advantages of this invention will become apparent from the following detailed description of preferred embodiments thereof that proceeds with reference to the accompanying drawings.

BRIEF DESCRIPTION OF THE DRAWINGS

The invention is illustrated by way of example, and not by way of limitation, in the FIGS. of the accompanying drawings in which like reference numerals refer to similar elements.

FIG. 1E illustrates a prior art directionally modulated backlight.

FIG. 1F illustrates a prior art directional display using a directionally modulated backlight.

FIGS. 2C-1 AND 2C-2 illustrate the directional light modulation aspects of the non-telecentric emissive micro pixel directional light modulator of this invention.

FIGS. 2D-1, 2D-2 AND 2D-3 illustrate the geometrical aspects of the directional light modulation pixel groups of the non-telecentric emissive micro pixel directional light modulator of this invention.

DETAILED DESCRIPTION OF THE PREFERRED EMBODIMENTS

Figure 1A:
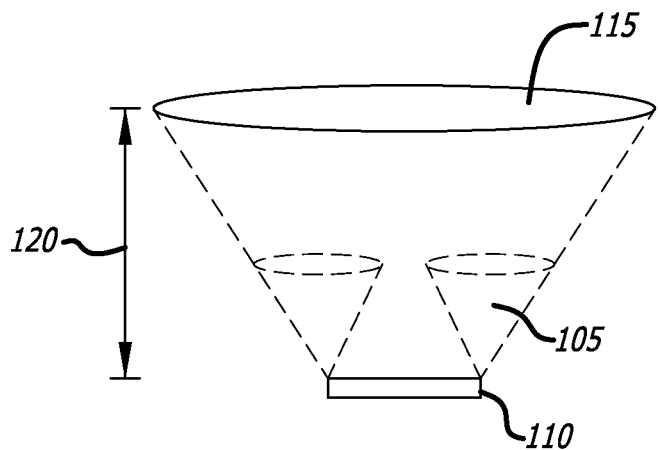
FIG. 1A illustrates prior art light projection that uses a telecentric spatial light modulator.
Figure 1B:
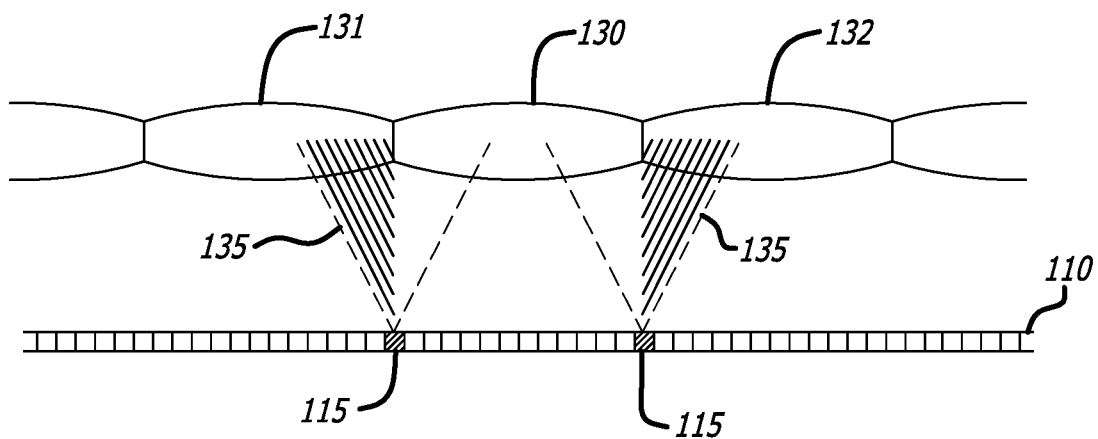
FIG. 1B illustrates a prior art directional light modulator that uses a telecentric spatial light modulator.
Figure 1C:
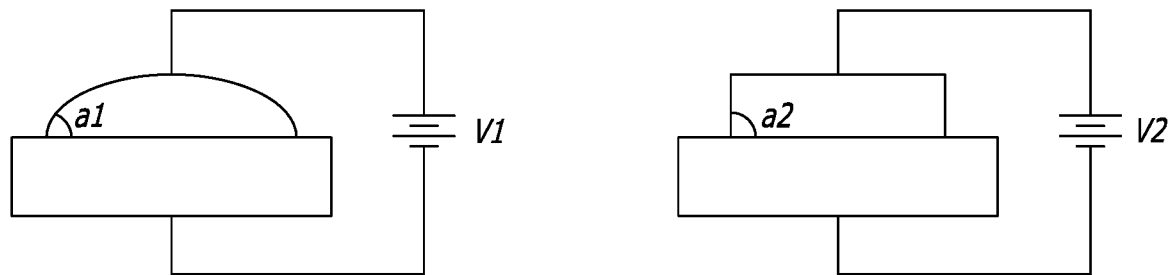
FIG. 1C illustrates a prior art directional light modulator that uses a liquid lens.
Figure 1D:
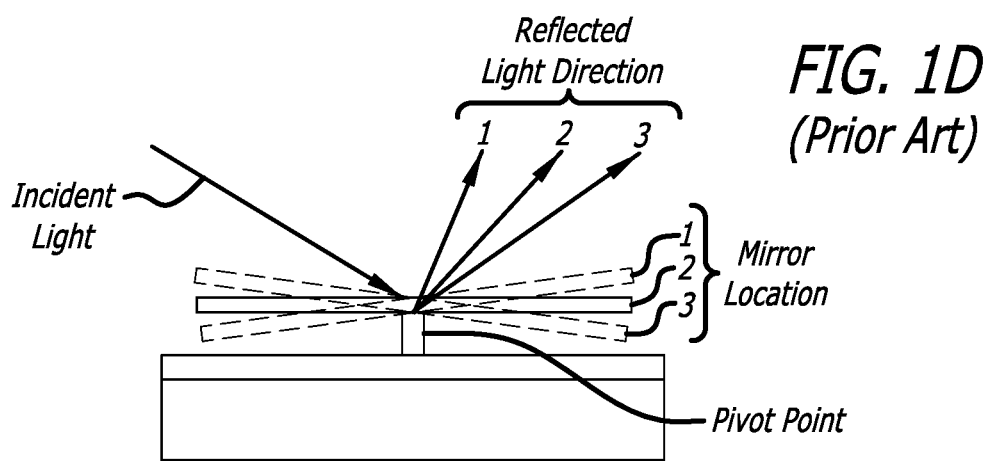
FIG. 1D illustrates a prior art directional light modulator that uses scanning mirrors.

References in the following detailed description of the present invention to "one embodiment" or "an embodiment" means that a particular feature, structure, or characteristic described in connection with the embodiment is included in at least one embodiment of the invention. The appearances of the phrase "in one embodiment" in various places in this detailed description are not necessarily all referring to the same embodiment.

In the description to follow, references are made to the word groups, such as in a directional modulation groups of micro pixels and similar references. When a non-telecentric emissive micro-pixel array light modulator in accordance with the present invention is to display a light field, reference to a group of pixels or to the corresponding micro optical elements is a reference to the pixels or micro optical elements associated with a single hogel. When the present invention is to display one or more two dimensional scenes at the same time, reference to a group of pixels or to the corresponding micro optical elements is a reference to all pixels of the non-telecentric emissive micro-pixel array light modulator or to one of the groups of pixels associated with a respective two dimensional scene.

The embodiments herein combine the emissive micro pixel array capabilities of an SSL imager with a monolithically fabricated pixel level micro optical element (referred to in the claims as a directional modulation layer) to create a non-telecentric spatial light modulator that performs the combined functionalities of color and brightness as well as directional modulation of the light emitted from each of its emissive micro pixels. Pixel level micro optical elements are a class of wafer level optics (WLO) which, in accordance with the present invention, are fabricated monolithically on an SSL imager wafer from semiconductor dielectric materials, such as silicon oxide or silicon nitride, or alternatively with a UV curable polymer using ultra violet (UV) imprint lithography. As used herein, wafer level or wafer means a device or matrix of devices having a diameter of at least 2 inches, and more preferably 4 inches or more. Among the primary advantages of WLO are the ability to fabricate small feature micro-scale optical elements and the ability to precisely align multiple layers of WLO optical elements with the optoelectronics elements of devices such as the SSL imager or a CMOS sensor, for example. The alignment precision that can be achieved by typical WLO fabrication techniques can be much less than one micron. The combination of the individual pixel addressability of the emissive micro pixel array of the SSL imager and a precisely aligned micro pixel level optical elements, herein referred to collectively as the "non-telecentric SSL imager", creates the first non-telecentric emissive SLM which enables the numerous applications highlighted in the previous discussion and detailed henceforth.

In the embodiments herein, pixels' color, brightness and directional light modulation is achieved by the combination of the SSL imager emissive pixels and light bending achieved by their associated micro pixel level optics that collectively comprise the non-telecentric emission SSL imager.

Figure 2A:
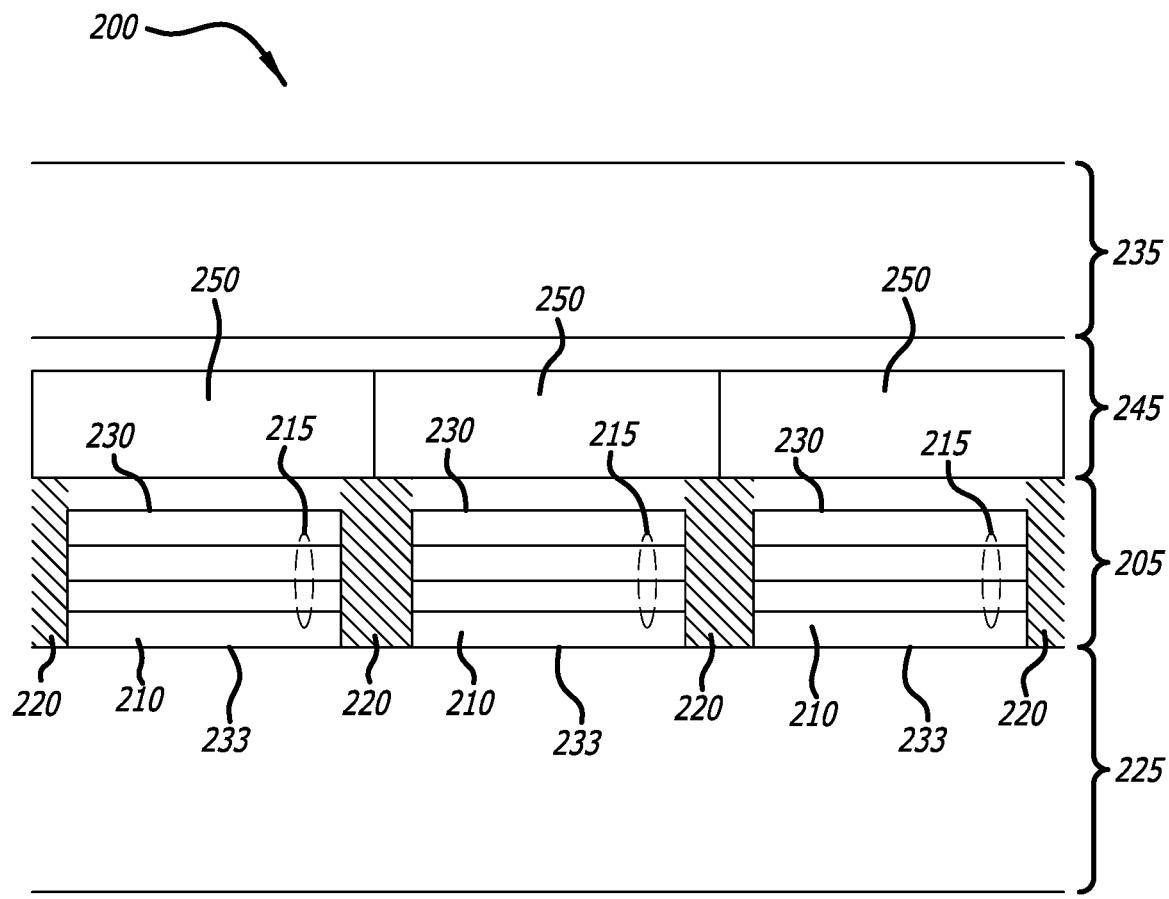
FIG. 2A illustrates a cross sectional view of a generalized non-telecentric emissive micro pixel light modulator (SSL imager) in accordance with this invention.

FIG. 2A illustrates a general cross sectional view of an exemplary non-telecentric emissive micro pixel (spatial) light modulator (SSL imager) 200 that may be used with the invention. As illustrated in FIG. 2A, the overall structure of the exemplary SSL imager 200 is a stack of multiple layers comprising the photonic micro pixels array layer 205 with the control layer 225 bonded to its non-emissive backside 233 and the directional modulation layer 245 and the cover glass layer 235 (optional in some embodiments) bonded to its emissive topside 230. The photonic layer 205 comprises the array of emissive multi-color micro pixels 210 with each micro pixel being a photonic cavity defined by its reflective sidewalls 220 and its reflective top and back side contacts that form the topside 230 and backside 233 of the photonic layer 205; respectively. The photonic layer 205 is a stack of multiple color emission III/V semiconductor sub-layers 215 which, when pixelated (i.e., formed into a micro pixel array using semiconductor lithography, etch and deposition techniques), form a multi-color stack of heterojunction diodes within the photonic cavity of each of the micro pixels 210 comprising the micro pixel array 200. Each of the micro pixels 210 is electrically coupled to the control layer 225 with multiple contact metal micro vias through the backside 233 and sidewalls 220 to control the on-off state of each pixel color emission sub-layer 215. The control layer 225 is a complementary metal oxide semiconductor (CMOS) comprising multiple digital logic sub-layers designed to convert (or process) the SSL imager digital input, coupled through the CMOS contact vias, into electrical signals that are coupled to each pixel to modulate their emitted light color and brightness. Depending on the geometry of the CMOS technology process used to fabricate the control layer 225, for example 180-nm CMOS versus 65-nm or smaller geometry CMOS, the control layer 225 can be used to implement either merely the micro pixel driving circuitry or to further implement the complex digital image processing of the digital image input that would lead to generating the micro pixel's electrical drive signal.

Figures 1, 2B:
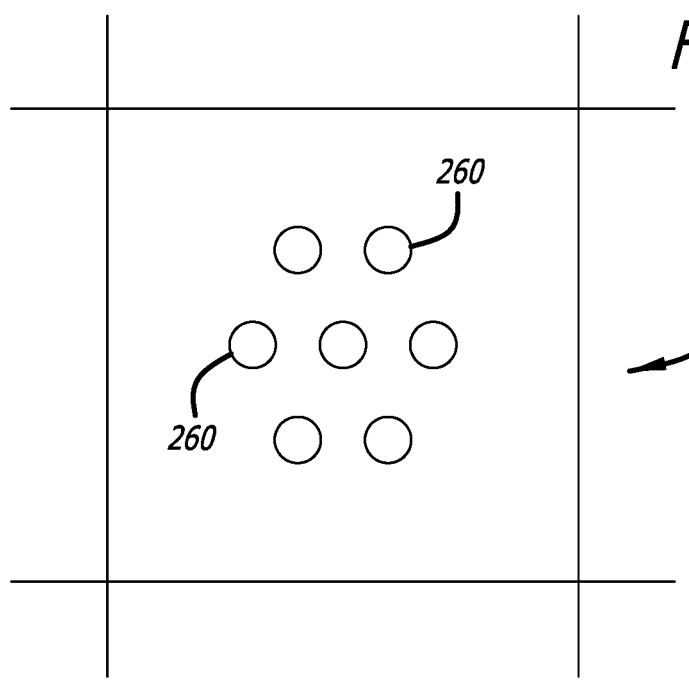
FIGS. 2B-1 AND 2B-2 illustrate top views of the light coupling topside of the photonic layer of the non-telecentric emissive micro pixel light modulator of this invention.
Figures 2, 2B:
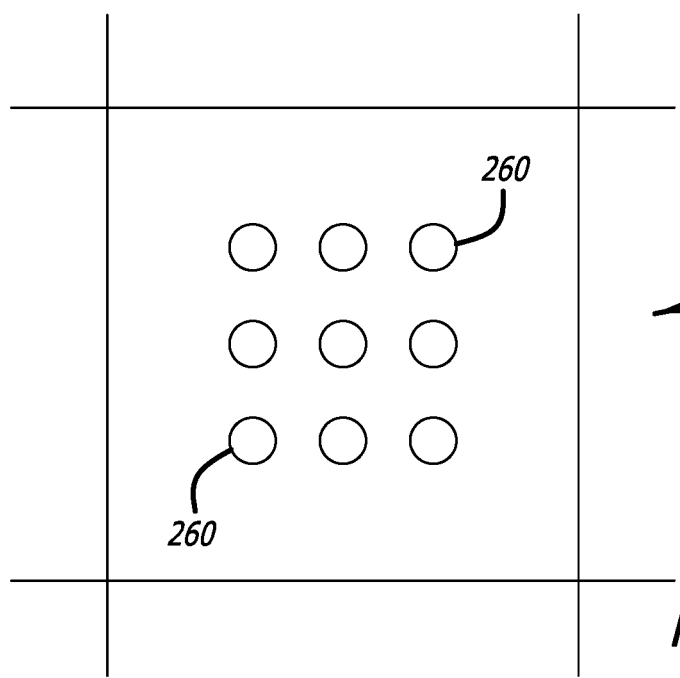

FIGS. 2B-1 and 2B-2 illustrate top views of the light coupling top side 230 of the photonic layer 205 of the non-telecentric emissive micro pixel light modulator (SSL imager) 200 according to embodiments herein. As illustrated in FIGS. 2B-1 and 2B-2, the light coupling topside 230 of each micro pixel 210 is comprised of a multiplicity of waveguides 260, which are formed on the topside sub-layer 230 using semiconductor lithography, etch and deposition techniques. As shown in FIGS. 2B-1 and 2B-2, the waveguides 260 may be located at various positions with respect to the light coupling top side 230 of the photonic layer 205. Depending on the waveguides 260 diameter, depth spacing pattern, and the dielectric semiconductor material used, the angle of divergence of the collimated light emission from micro pixels 210 can be tailored within an angle of divergence ranging from ±5° to ±45°. Referring back to FIG. 2A, the at least partially collimated light emitted from each of the micro pixels 210 is coupled onto their corresponding micro pixel level optical elements 250 comprising the directional modulation layer 245.

Figure 2C:
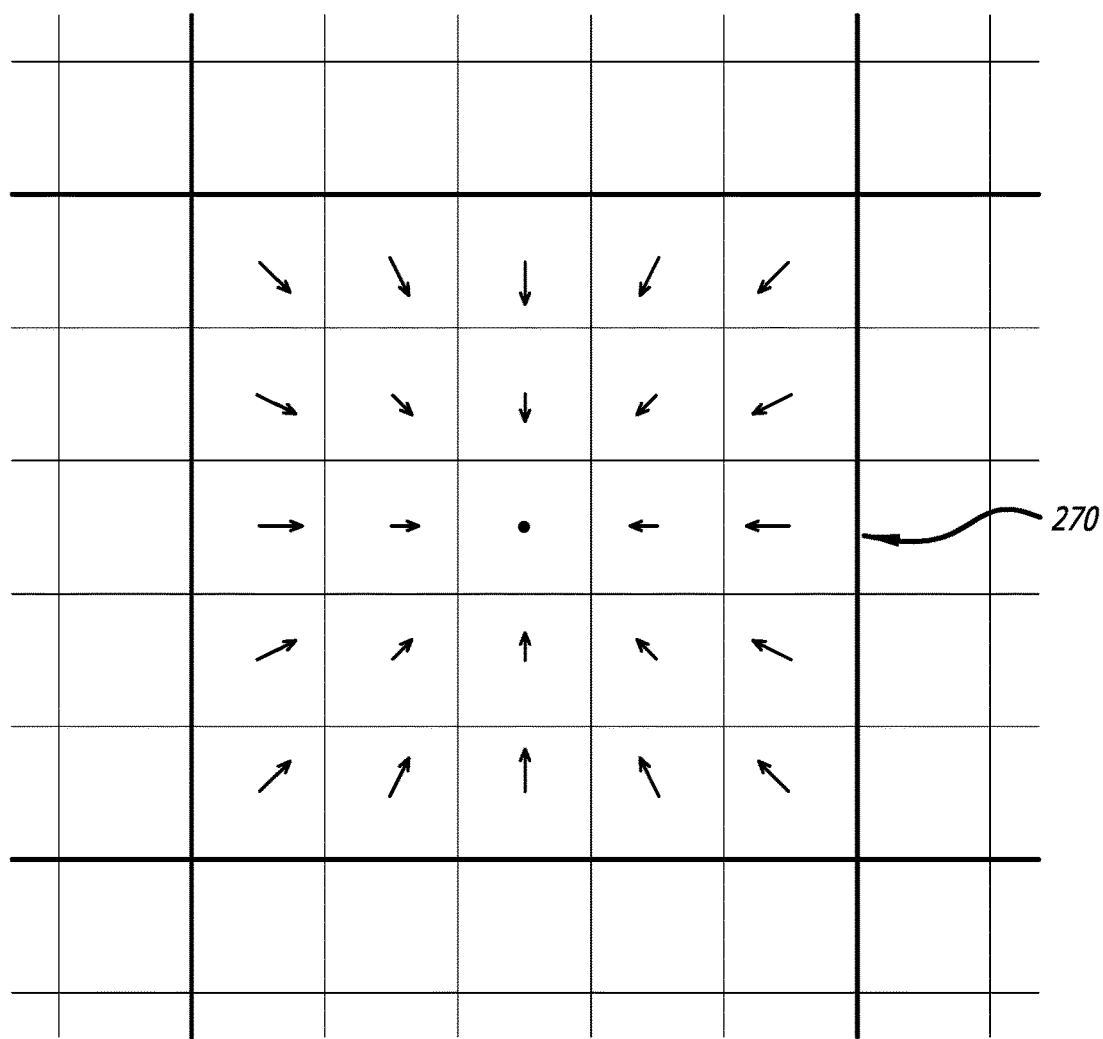
Figure 1:
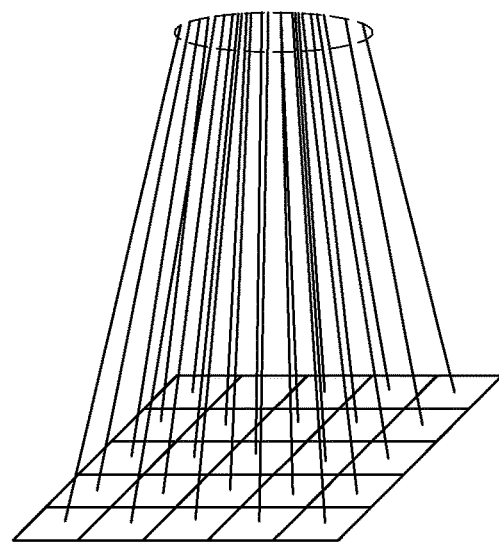
Figure 2C:
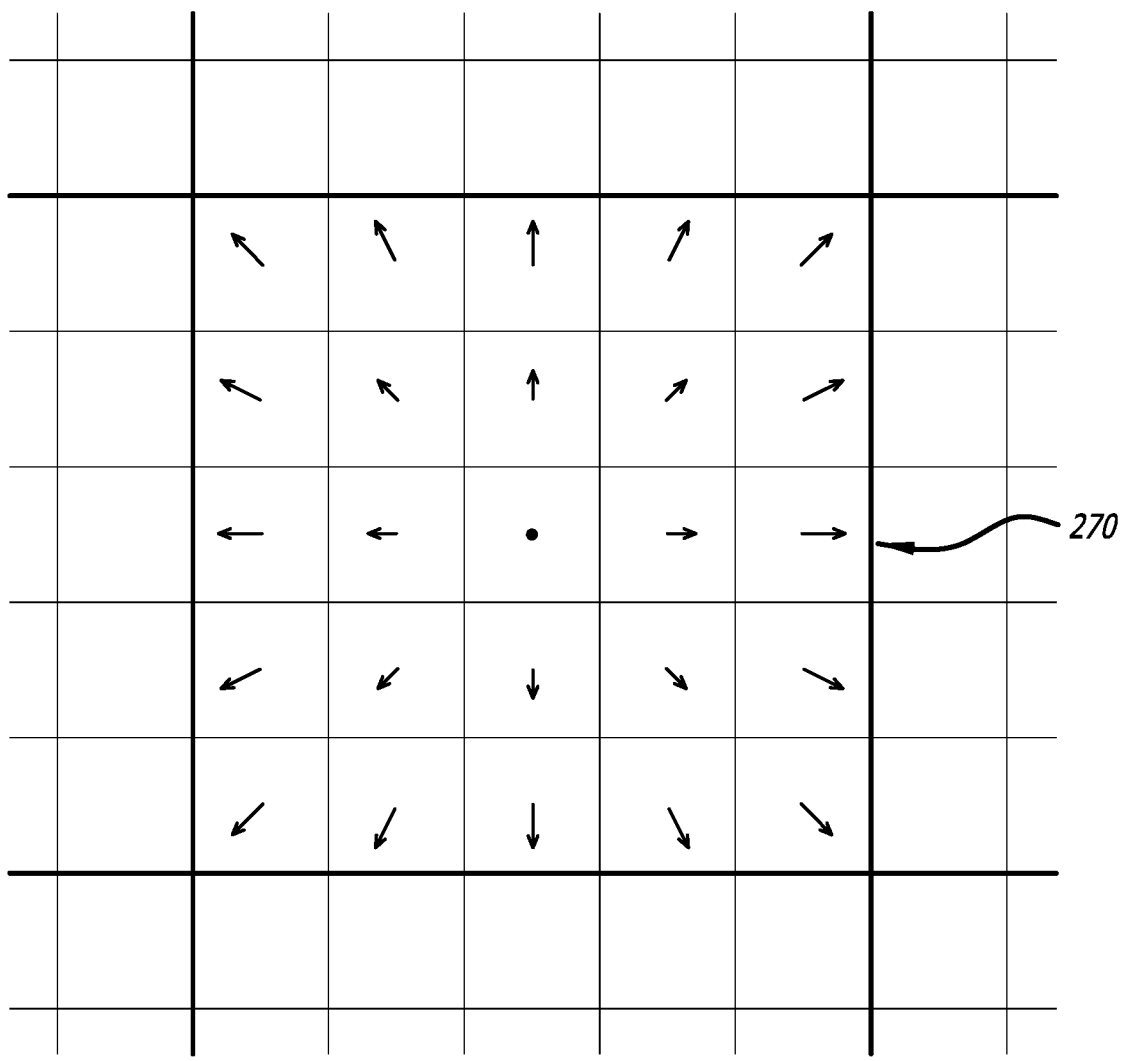
Figure 2:
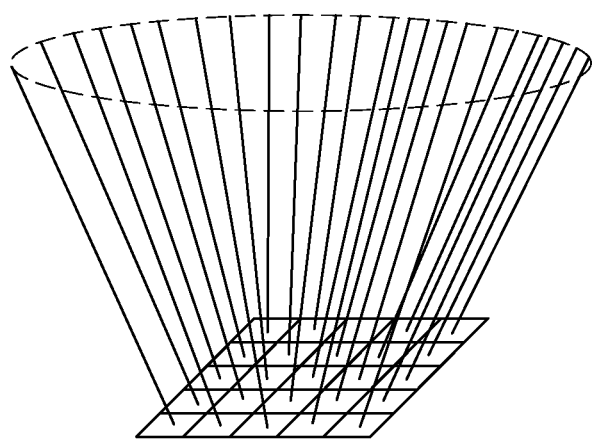
Figures 1, 2D:
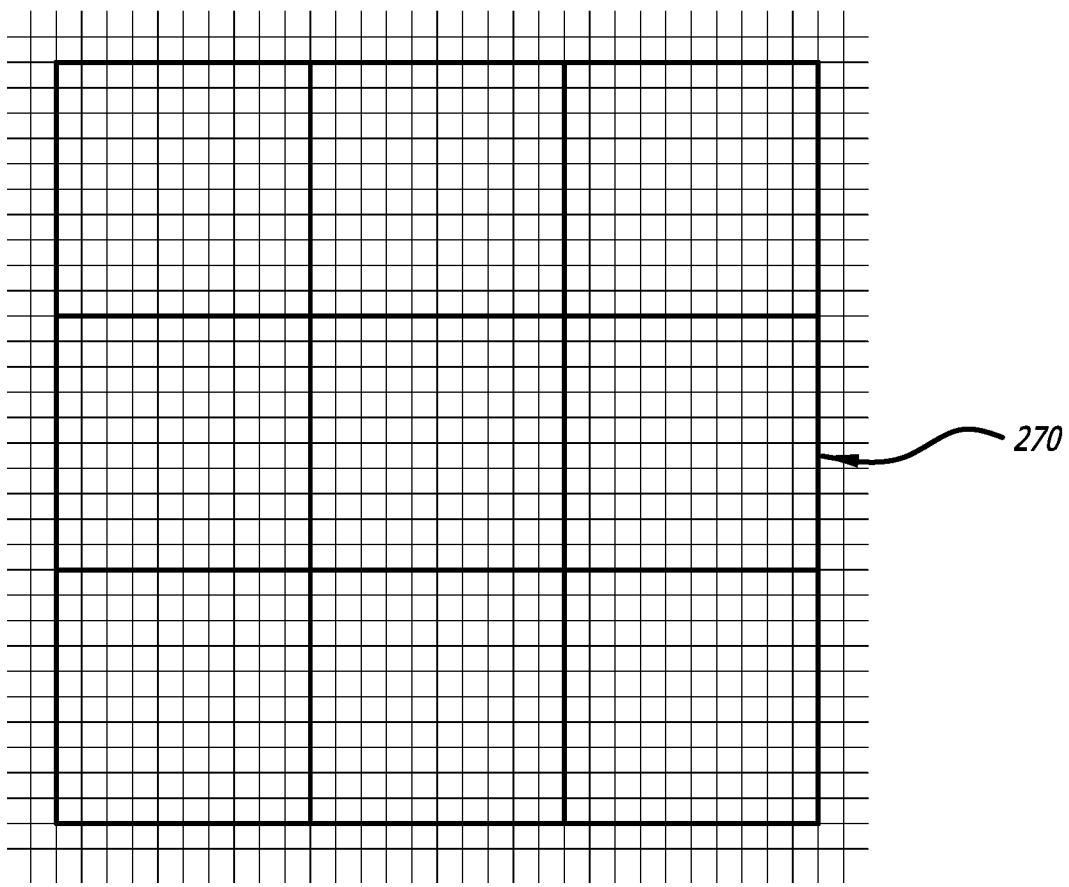

FIGS. 2C-1 and 2C-2 illustrates the functional aspects of the directional modulation layer 245 of the non-telecentric emissive micro pixel light modulator (SSL imager) 200 of the embodiments herein. As illustrated in the multiple panels of FIGS. 2C-1 and 2C-2, the micro optical element 250 associated with each of the micro pixels 210 may be designed to direct (or directionally modulate) the light coupled onto it from its corresponding micro pixels 210 to a unique direction relative to its perpendicular axis. The multiple panels of FIGS. 2C-1 and 2C-2 illustrate two possible examples of the directional modulation patterns that can be realized by the directional modulation layer 245 of the non-telecentric emissive micro pixel light modulator (SSL imager) 200 of the embodiments herein. The first panel of FIG. 2C-1 illustrates an example in which the directional modulation layer 245 is designed to realize a convergent directional modulation pattern with the light emitted from the directional modulation group 270 of micro pixels 210 directionally converge systematically toward the perpendicular axis from the peripheral edges of the directional modulation group 270 toward its center. The second panel of FIG. 2C-2 illustrates an example in which the directional modulation layer 245 is designed to realize a divergent directional modulation pattern with the light emitted from the directional modulation group 270 of micro pixels 210 directionally diverge systematically away from the perpendicular axis from the center of the directional modulation group 270 toward its peripheral edges. In FIGS. 2C-1 and 2C-2, the arrows placed at the center of each of the micro pixels 210 are meant to indicate the direction of the chief ray of the light bundle emitted from each of the micro pixels 210 as represented by the angle of each respective arrow in the (x, y) plane and the length of each respective arrow representing or suggestive of its angle from the perpendicular axis.

FIGS. 2D-1, 2D-2 and 2D-3 illustrate the geometrical aspects of the directional modulation pixel groups 270 of the non-telecentric emissive micro pixel light modulator (SSL imager) 200 of the embodiments herein. As illustrated in the multiple panels of FIGS. 2D-1, 2D-2 and 2D-3, the geometrical shape of the directional modulation pixel groups 270, in terms of the number of pixels representing its dimensions in the (x, y) plane of the micro pixel array, can possibly be a square (see FIG. 2D-1), rectangle (see FIG. 2D-3) or hexagonal (see FIG. 2D-2) among many possible shapes depending on the intended application. The size, in micro pixels, of the directional pixel group 270 can extend to include either a sub-region of the SSL imager micro pixel array or the entire micro pixel array of the SSL imager. In the case when the directional pixel group 270 extends over a sub-region of the SSL imager micro pixel array, it could be a repeated directional modulation pattern or in some cases it could be a unique directional modulation pattern for each directional modulation pixel group 270 depending on the application.

The pixel level micro optical elements 250 of the directional modulation layer 245 would have the same planar dimensions in the (x, y) plane as their respective emissive micro pixel 210. The pixel level micro optical elements 250 could be realized as either a refractive optical element (ROE) or a diffractive optical element (DOE). In either of these cases, the optical design parameters of each of the pixel level micro optical elements 250 would be selected to realize the selected directional modulation pattern across the modulation pixel group 270 as explained earlier. The pixel level micro optical elements 250 would be fabricated monolithically on the SSL imager wafer from either semiconductor dielectric materials, such as silicon oxide or silicon nitride, or from polymer using ultra violet (UV) imprint lithography. In one embodiment, the fabrication of the pixel level micro optical elements 250 would be accomplished as a sequence of lithography, etch and deposition steps directly on the topside (the light emissive side) of the SSL imager wafer that already incorporates on its topside the photonic layer 205, which incorporates the array of micro pixels 230, and on its backside the CMOS control layer 225. In another embodiment of this invention, the fabrication of the pixel level micro optical elements 250 would be accomplished as a sequence of lithography, etch and deposition steps on one side of a wafer size cover glass layer 235, then the micro optical elements 250 side of the cover glass wafer is aligned and bonded directly on the top side (the light emissive side) of the SSL imager wafer that already incorporates the photonic layer 205 and the CMOS control layer 225. In yet another embodiment of this invention, the fabrication of the pixel level micro optical elements 250 would be accomplished as a sequence of lithography, etch and deposition steps on one side of the cover glass layer 235, then the micro optical elements 250 side of the glass cover wafer is used as a substrate to which the multiple sub-layers constituting the photonic layer 205, upon which the array of micro pixels 230 are formed, and the CMOS control layer 225 would be bonded sequentially to fabricate the non-telecentric emissive micro pixel light modulator (SSL imager) 200 of the embodiments herein.

In another embodiment, the fabrication of the pixel level micro optical elements 250 would be accomplished using WLO techniques in which the micro optical elements 250 would be formed by embossing a UV curable polycarbonate polymer on one side of the cover glass layer 235, then the formed micro optical elements 250 side of the wafer is aligned and bonded directly on the top side (the light emissive side) of the SSL imager wafer that already incorporates the photonic layer 205 and the CMOS control layer 225. In this method, the layer of pixel level micro optical elements 250 would be fabricated using a master mold of the array of micro optical elements 250 that is first fabricated using micro machining or laser ablation techniques, then copied on a UV transparent mold that would be used to emboss the UV curable polycarbonate polymer on one side of a wafer-size cover glass 235. The embossing of the array of micro optical elements 250 would also incorporate the embossing of alignment marks that would be used to align the micro optical elements 250 to their respective micro pixels 230 during the bonding process with the SSL imager wafer that already incorporates the photonic layer 205 and the CMOS control layer 225. In this case, the bonding of the glass cover wafer 235 with the embossed micro optical elements 250 to the of the SSL imager wafer, that already incorporates the photonic layer 205 and the CMOS control layer 225, would be accomplished using UV curable optical glue that would be spread or sprayed on the bonding surface of either or both wafers, then the wafers are brought into alignment using alignment marks previously incorporated onto the surface of each wafer, then the aligned wafer pair is scanned with a UV laser beam or illuminated by a UV flood light to cure the optical glue bonding layer placed on the bonding surfaces of the two wafers.

Figure 3A:
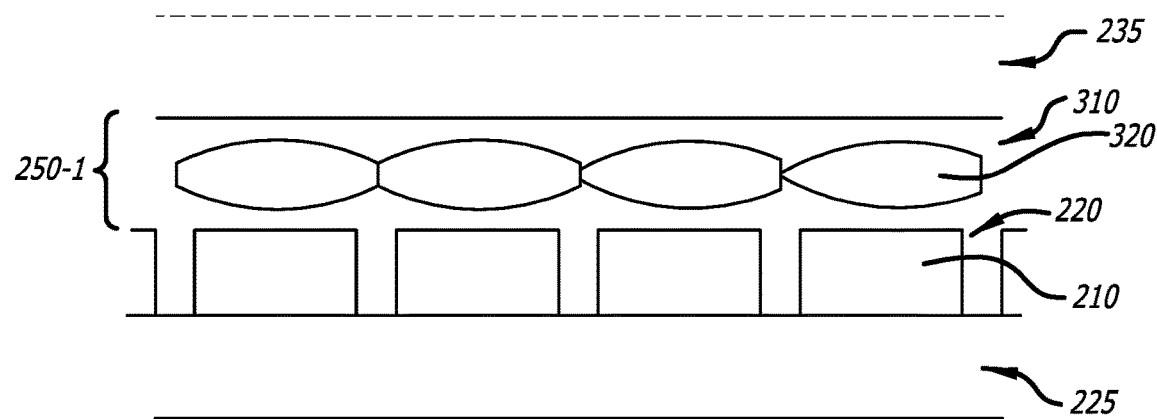
FIG. 3A illustrates a schematic cross section of an embodiment of this invention in which the array pixel level micro optical elements are realized as de-centered refractive optical elements (ROE).
Figure 3B:
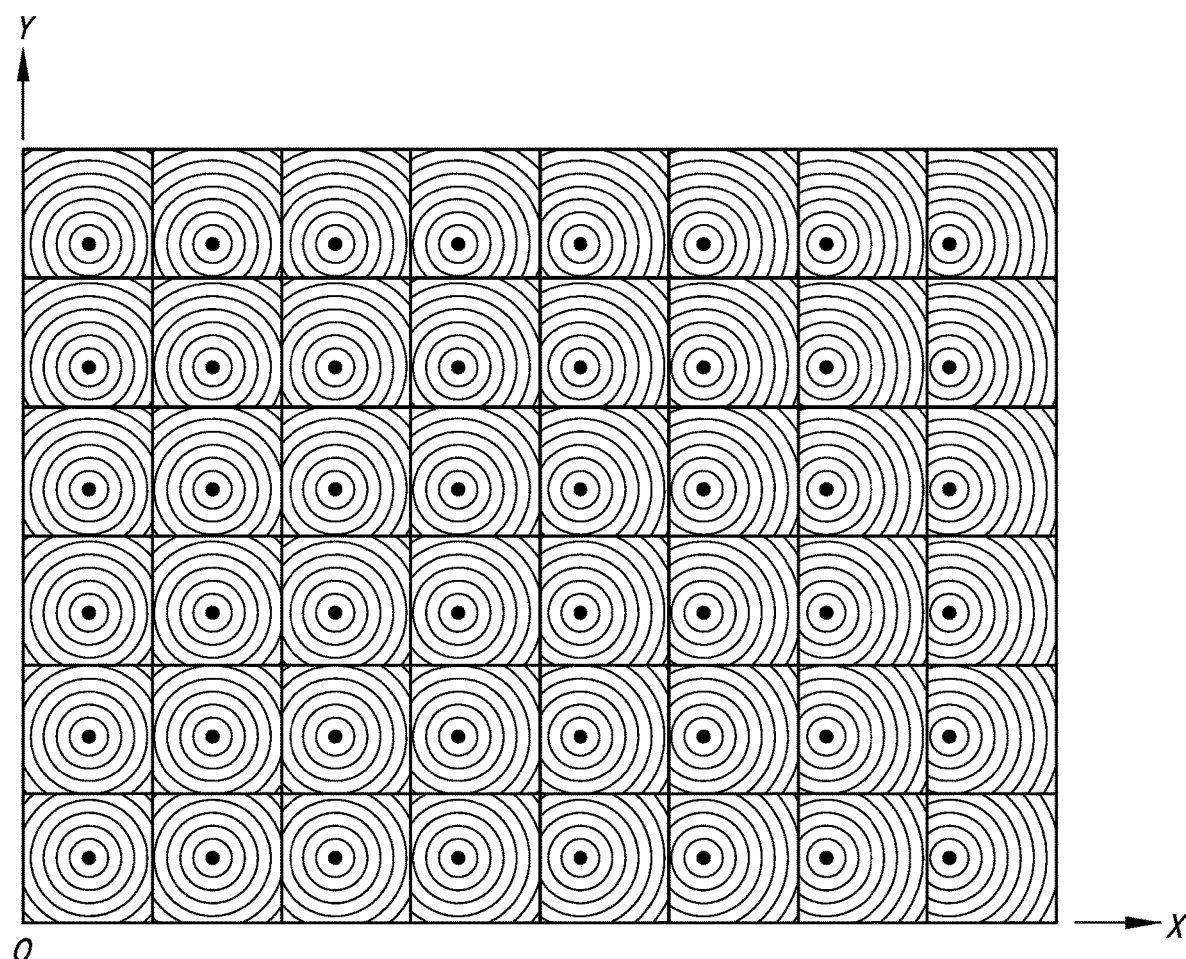
FIG. 3B illustrates a face view of the directional modulation layer of an embodiment of this invention in which the array pixel level micro optical elements are realized as de-centered refractive optical elements (ROE).

"De-centered" Refractive Micro Optical Element (ROE)—FIG. 3A illustrates one instantiation of the embodiment of this invention in which the array pixel level micro optical elements 250 are realized as refractive optical elements (ROE). In this embodiment the pixel level refractive micro optical elements 250 directional modulation aspects are realized using de-centered micro lenses 250-1 formed by successive layers of dielectric materials 310 and 320 with different indexes of refraction. FIG. 3A and 3B are side and top views; respectively, of the non-telecentric emissive micro pixel light modulator (SSL imager) 200 of the embodiments herein when realized as de-centered refractive micro optical elements 250-1. In this embodiment, the array of pixel level micro optical elements 250-1 would be fabricated monolithically at the wafer level as multiple layers of semiconductor dielectric materials, such as silicon oxide for the low index layer 310 and silicon nitride for the high index layer 320, using semiconductor lithography, etch and deposition techniques. As illustrated in FIG. 3A, the array pixel level micro optical elements 250-1 are realized using multiple layers, the dielectric materials 310 and 320 with different indexes of refraction successively (sequentially) deposited to form the refractive surfaces of the pixel level micro optical elements 250-1. The top view panel of FIG. 3B illustrates the de-centered micro lenses method when used to realize an exemplary directional modulation group 270 whereby the de-centeration in the (x, y) plane of the refractive micro optical elements 250-1 would be proportional to the directional modulation to be realized by each of the refractive micro optical elements 250-1. As illustrated in FIG. 3B, in order to realize the desired directional modulation pattern across the intended directional modulation pixel group 270, the center of the refractive micro optical elements 250-1 associated with the micro pixel 230 at the center of the directional modulation group 270 would be aligned with the center of its respective pixel 230 but the center of the refractive micro optical elements 250-1 away from the center of directional modulation pixel group 270 would have their centers offset from the center of their respective pixels 230 with such an offset gradually increasing for micro optical elements 250-1 further away from the center of the directional modulation pixel group 270. The de-centeration offset of the refractive micro optical elements 250-1 would converge toward or diverge away from the center of the directional modulation pixel group 270 when the directional modulation pattern converges toward or diverges away from the center of the directional modulation pixel group 270, respectively. The angular separation $\delta\theta$ between the directional modulation realized by the individual de-centeration of the refractive micro optical elements 250-1 would be made proportional to the desired directional modulation of the angular extent $\Theta$. For example, for an N×N pixels modulation group 270 having the angular extent $\Theta$, the angular separation $\delta\theta$ between the directional modulation realized by the individual de-centeration of the refractive micro optical elements 250-1 would be equal to $\Theta/N$.

Figure 4A:
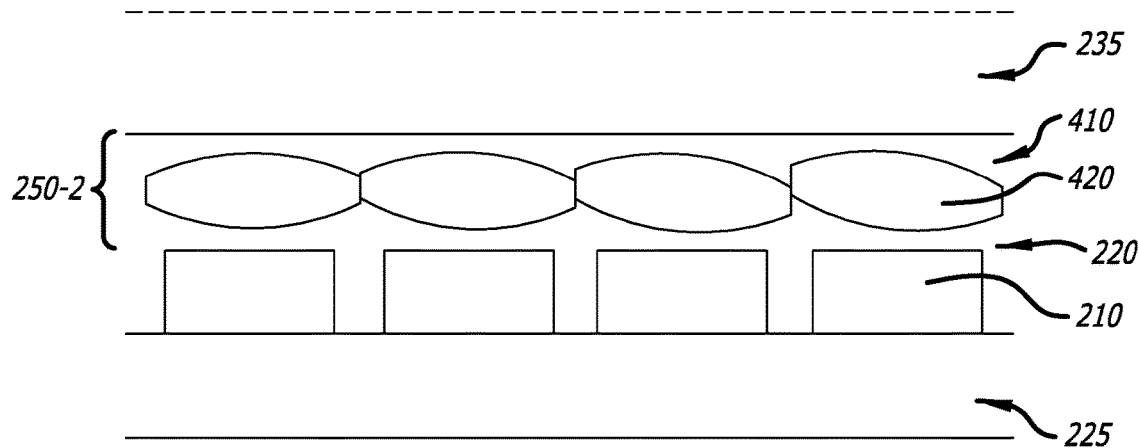
FIG. 4A illustrates a schematic cross section of an embodiment of this invention in which the array pixel level micro optical elements are realized as tilted refractive optical elements (ROE).
Figure 4B:
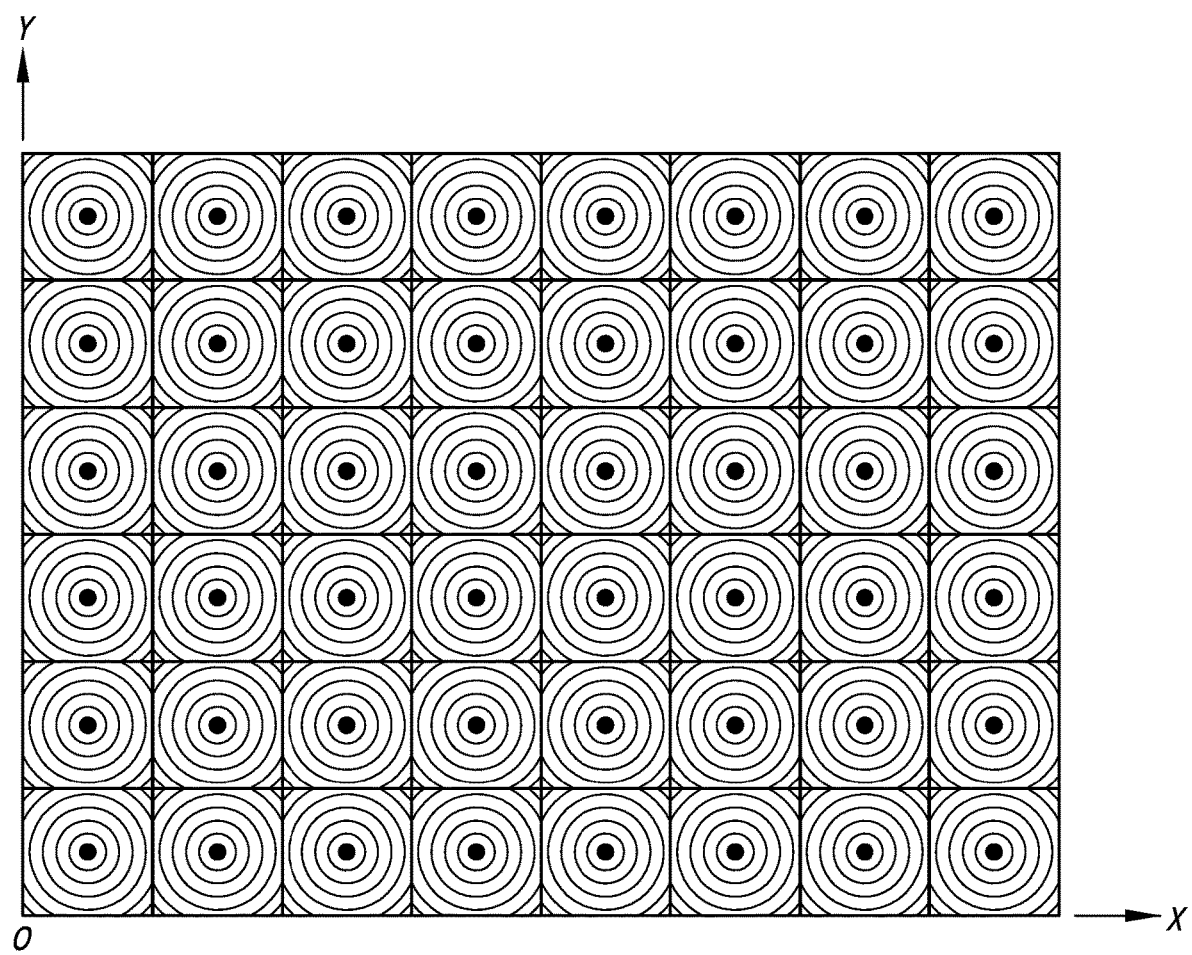
FIG. 4B illustrates a face view of the directional modulation layer of an embodiment of this invention in which the array pixel level micro optical elements are realized as tilted refractive optical elements (ROE).

"Tilted" Refractive Micro Optical Element (ROE)—FIG. 4A illustrates yet another instantiation of the embodiment of this invention in which the array of pixel level micro optical elements 250 are realized as refractive optical elements (ROE). In this embodiment, the pixel level refractive micro optical elements 250 directional modulation aspects are realized using tilted micro lenses 250-2 formed by successive layers of dielectric materials 410 and 420 with different indexes of refraction. FIG. 4A and 4B are side and top views; respectively, of the non-telecentric emissive micro pixel light modulator (SSL imager) 200 of the embodiments herein when realized using tilted refractive micro optical elements 250-2. In this embodiment, the array of pixel level micro optical elements 250-2 would be fabricated monolithically at the wafer level as multiple layers of semiconductor dielectric materials, such as silicon oxide for the low index layer 410 and silicon nitride for the high index layer 420, using semiconductor lithography, etch and deposition techniques. As illustrated in FIG. 4A the array pixel level micro optical elements 250-2 are realized using multiple layers dielectric materials 410 and 420 with different indexes of refraction successively (sequentially) deposited to form the refractive surfaces of the pixel level micro optical elements 250-2. The top view panel of FIG. 4A illustrates the tilted micro lenses method when used to realize an exemplary directional modulation group 270 whereby the tilting of optical axis of the refractive micro optical elements 250-2 would be proportional to the directional modulation to be realized by each of the refractive micro optical elements 250-2. As illustrated in FIG. 4A, in order to realize the desired directional modulation pattern across the intended directional modulation pixel group 270, the optical axis of the refractive micro optical elements 250-2 associated with the micro pixel 230 at the center of the directional modulation group 270 would be aligned with the axis perpendicular to the (x, y) plane of the refractive micro optical elements 250-2 but the optical axis of the refractive micro optical elements 250-2 away from the center of directional modulation pixel group 270 would have their optical axis inclined from the axis perpendicular to the (x, y) plane with such an inclination gradually increasing for micro optical elements 250-2 further away from the center of the directional modulation pixel group 270. The tilting of the optical axis of the refractive micro optical elements 250-2 would converge toward or diverge away from the axis perpendicular to the (x, y) plane when the directional modulation pattern converges toward or diverges away from the center of the directional modulation pixel group 270, respectively. The angular separation $\delta\theta$ between the directional modulation realized by the individual optical axis tilting of the refractive micro optical elements 250-2 would be made proportional to the desired directional modulation of the angular extent $\Theta$. For example, for an N×N pixels modulation group 270 having the angular extent $\Theta$, the angular separation $\delta\theta$ between the directional modulation realized by the individual de-centeration of the refractive micro optical elements 250-2 would be equal to $\Theta/N$.

Figure 5A:
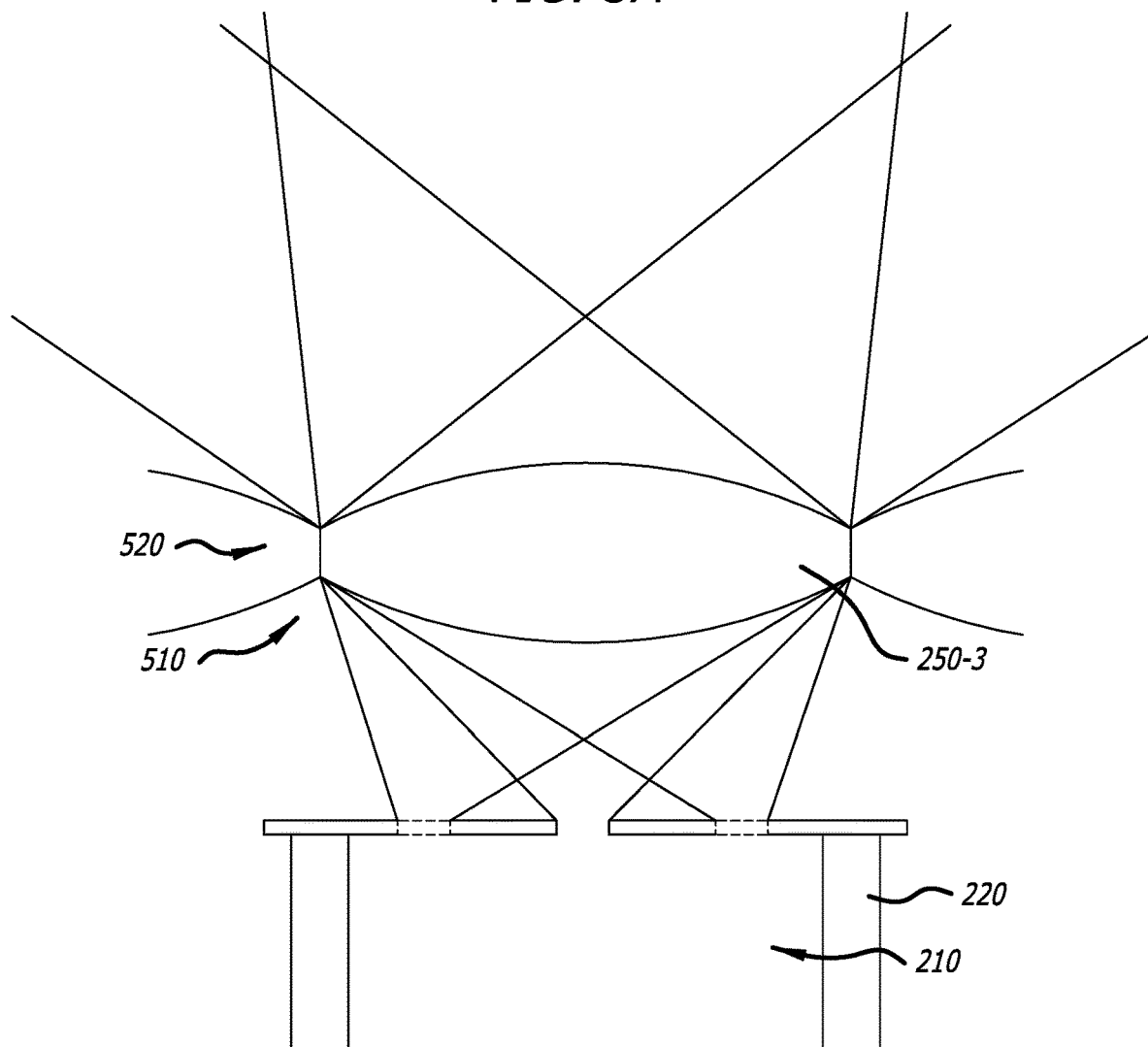
FIG. 5A illustrates a schematic cross section of a waveguide exit of an embodiment of this invention in which the array pixel level micro optical elements are realized as spatially modulated refractive optical elements (ROE).
Figure 5B:
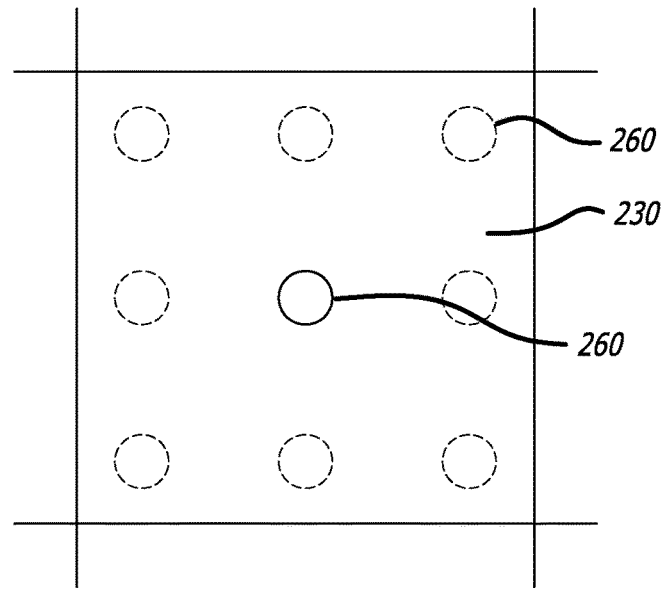
FIG. 5B illustrates a top view of the waveguide exit of an embodiment of the invention in which the array pixel level micro optical elements are realized as spatially modulated refractive optical elements (ROE).

Spatially Modulated Refractive Micro Optical Element (ROE)—FIG. 5A illustrates yet another embodiment of this invention in which the array of pixel level micro optical elements 250 are realized as refractive optical elements (ROE). In this embodiment, the pixel level refractive micro optical elements 250 directional modulation aspects are realized using spatially modulated micro lenses 250-3 formed by successive layers of dielectric materials 510 and 520 with different indexes of refraction. FIG. 5A and 5B are side view and top view illustrations; respectively, of the non-telecentric emissive micro pixel light modulator (SSL imager) 200 of the embodiments herein when realized using the spatially modulated refractive micro optical elements 250-3. As illustrated in FIG. 5A and FIG. 5B, in this embodiment the centers of the pixel level refractive micro optical elements 250-3 are aligned with their respective emissive micro pixels 205 and their optical axes are also aligned perpendicular to the (x, y) plane but in the case of this embodiment, the directional modulation is realized by using Fourier (or field) lens micro optical elements 250-3 combined with an emissive micro pixel 205 having a single waveguide 260 that is spatially modulated, or appropriately positioned in the (x, y) plane, within the pixel's optical aperture. In FIG. 5B, the single waveguide is illustrated by the solid circle at the center of the pixel illustrated, with the limits of its possible spatial modulation in the x and y directions being illustrated by the dashed circles 265. In this embodiment, the Fourier lens' aspects of the micro optical elements 250-3 may cause its chief ray to be either aligned with, or inclined from, the perpendicular to the (x, y) plane when the single waveguide 260 of its respective emissive micro pixel 205 is positioned at the center or offset from its optical aperture; respectively, with the inclination of chief ray of the micro optical elements 250-3 from the perpendicular to the (x, y) plane being in the direction of the axis extended from the center of waveguide 260 to the center of the pixel's micro optical element 250-3 and with angular inclination that is proportional to the spatial offset of single waveguide 260 from the center of its respective emissive micro pixel 205. FIG. 5B illustrates the micro pixel's single waveguide spatial offset method of this embodiment when used to realize an example directional modulation group 270 whereby the micro pixel's 230 single waveguide 260 spatial offset from the center of its optical aperture in the (x, y) plane would be proportional to the directional modulation to be realized by each of the refractive micro optical elements 250-3. As illustrated in FIG. 5A, in order to realize the desired directional modulation pattern across the intended directional modulation pixel group 270, the micro optical elements 250-3 at the center of the directional modulation group 270 would have the single waveguide 260 of its associated emissive micro pixel 205 aligned with the center of its optical aperture but the micro optical elements 250-3 away from the center of directional modulation pixel group 270 would have their associated emissive micro pixels 205 having their single waveguide 260 spatial offset from the centers of their optical apertures gradually increasing for the emissive micro pixel 205 and micro optical element 250-3 pairs further away from the center of the directional modulation pixel group 270. The spatial offset of single waveguide 260 of the emissive pixels 230 and their respective refractive micro optical elements 250-3 would converge toward or diverge away from the center of the emissive micro pixels 205 of the directional modulation pixel group 270 when the directional modulation pattern diverges away from or converges toward the center of the directional modulation pixel group 270, respectively. The angular separation $\delta\theta$ between the directional modulation realized by the individual single waveguide 260 spatial offset associated with the refractive micro optical elements 250-3 would be made proportional to the desired directional modulation of the angular extent $\Theta$. For example, for an N×N pixels modulation group 270 having the angular extent $\Theta$, the angular separation $\delta\theta$ between the directional modulation realized by the refractive micro optical elements 250-3 single waveguide 260 spatial offset would be equal to $\Theta/N$.

In other applications, the spatially modulated refractive micro optical element (ROE) of the directional modulation layer described above need not have the micro optical element 250-3 at the center of the directional modulation group or have the single waveguide 260 of its associated emissive micro pixel 205 aligned with the center of its optical aperture. Further, the directional modulation layer 245 of the embodiment of FIGS. 5A and 5B might be geometrically, but not physically, intentionally shifted in an x,y plane relative to the emissive micro pixels 205. The result would be that all the micro optical elements 250-3 so shifted would have less truncation on one end and a greater truncation on the other end. This would create a directional bias in the emission which would then be controllable by the intentional positioning of each single waveguide in the group, or pixel array, creating the bias while preserving the range of directional modulation available by selective positioning of the single waveguides.

Figure 6A:
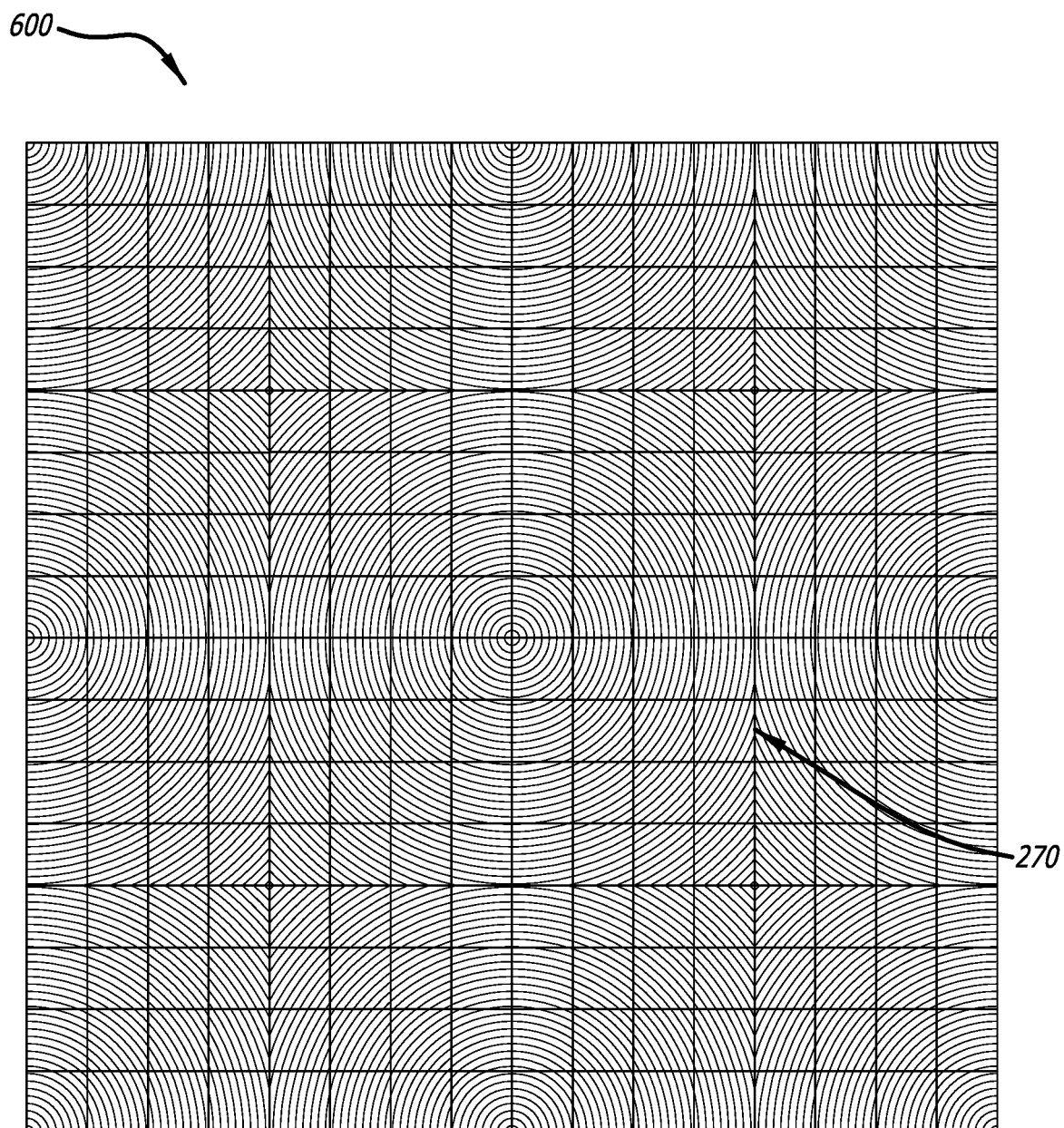
FIG. 6A illustrates an embodiment of this invention in which the array pixel level micro optical elements are realized as diffractive optical elements (DOE).
Figure 6B:
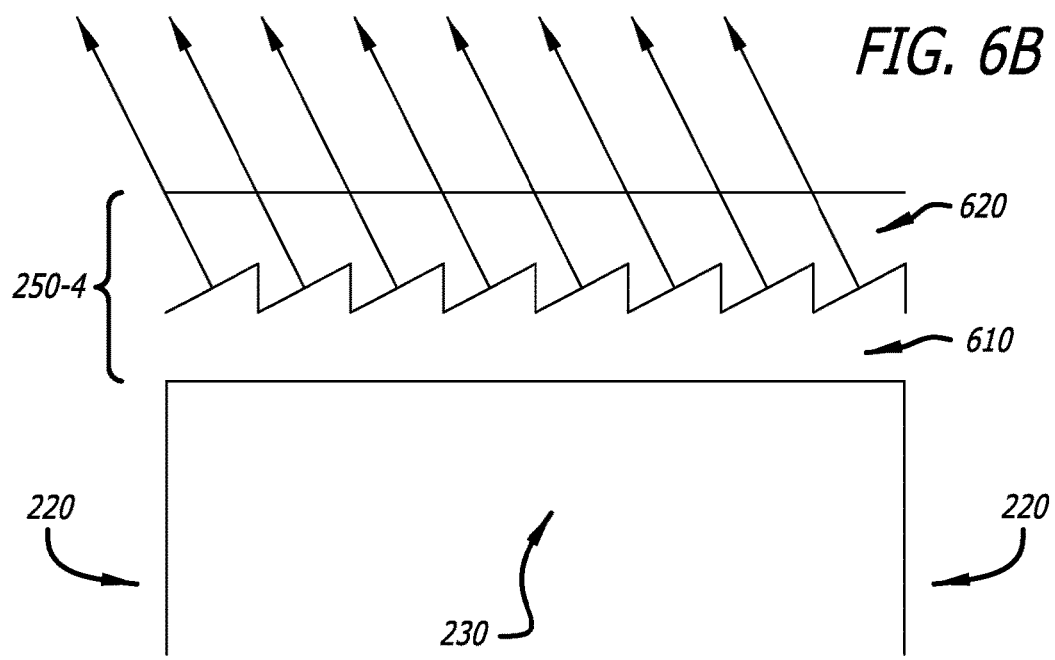
FIG. 6B illustrates an example in which the SSL imager pixels' diffractive optical elements are realized using multiple dielectric layers that form a blazed grating.

"Diffractive" Micro Optical Element (DOE)—FIG. 6A illustrates an embodiment of this invention in which the array pixel level micro optical elements 250 are realized as diffractive optical elements (DOE). In this embodiment the pixel level micro optical elements 250 directional modulation aspects are realized using micro grating 250-4 formed by successive layers of either metal rails or dielectric materials with different indexes of refraction. FIG. 6A and 6B are side view and top view illustrations; respectively, of the non-telecentric emissive micro pixel light modulator (SSL imager) 200 of the embodiments herein when realized using micro grating diffractive optical elements 250-4. In this embodiment the array of pixel level micro grating elements 250-4 would be fabricated monolithically at the wafer level as multiple layers of semiconductor dielectric materials, such as silicon oxide for the low index layer 610 and silicon nitride for the high index layer 620, or metal rails using semiconductor lithography, etch and deposition techniques. As illustrated in FIG. 6A the array pixel level micro grating elements 250-4 are realized using multiple layers of dielectric material with different indexes of refraction successively (sequentially) deposited to form the diffractive surfaces of the pixel level micro optical elements 250-4 (FIG. 6B). The top view of FIG. 6A illustrates the micro DOE method when used to realize an exemplary directional modulation group 270 whereby the micro grating optical element 250-4 diffraction angle (measured from the normal axis) and axial orientation of the micro grating diffractive optical elements 250-4 in the (x, y) plane would be proportional to the directional modulation to be realized by each of the diffractive micro optical elements 250-4.

As illustrated in FIG. 6A, a convergent (or divergent depending on the selected design parameters of the diffractive optical elements 250-4) directional modulation pattern would be realized across the intended directional modulation pixel group 270 by having the axial orientation of the diffractive micro optical elements 250-4 associated with each of the emissive micro pixels 205 be aligned with radial axis of the directional modulation group 270 and having their diffraction angle be proportional to their radial distance from the center of the modulation group 270. The angular separation $\delta\theta$ between the directional modulation realized by the individual diffractive micro optical elements 250-4 would be proportional to the desired directional modulation angular extent or field of view (FOV) $\Theta$ of the directional modulation pixel group 270. For example in the case of the illustration of FIG. 6A that shows a modulation group 270 comprised of 8×8 of the micro pixels 205, when the directional modulation angular extent or field of view (FOV) $\Theta$ equals 45 degrees, the angular separation $\delta\theta$ between the directional modulation realized by the individual diffractive micro optical elements 250-4 would be 5.625 degrees.

The SSL imager 200 pixels' diffractive optical elements 250-4 can be realized using transmission grating such as blazed grating or rail grating, for example. The illustration of FIG. 6B shows an example in which the SSL imager 200 pixels' diffractive micro optical elements 250-4 are realized using multiple dielectric layers 610 and 620 having different indexes that form a blazed grating, for example using high index silicon nitride for layer 610 and lower index silicon oxide for layer 620. In the illustration of FIG. 6B the slant angle and pitch of the blazed grating would be selected to realize the desired diffraction angle of each diffractive micro optical elements 250-4 and consequently the directional modulation of their associated emissive micro pixels 205 of the SSL imager 200. In the example of FIG. 6B, the index of the layer 610 would preferably be selected to match the index of the pixel's photonic layer 215, thus for example, using the higher index silicon nitride for layer 610. The index difference between the high index layer 610 and the low index layer 620 of the pixels' diffractive micro optical elements 250-4 would govern the maximum diffraction angle of the pixels' diffractive optical elements 250-4 and consequently the index difference between the two dielectric layers 610 and 620 would be a design parameter that would affect the total angular extent or field of view (FOV) realizable by the directional modulation groups 270 of the SSL imager 200 of this embodiment. For example although FIG. 6A shows a lower index dielectric material 620 capping the high index layer 610, it would be possible to have the high index layer 610 be the top layer of the SSL imager 200 pixels in order to maximize the pixel's diffraction angular extent and consequently the realizable field of view (FOV) of the SSL imager 200 directional modulation groups 270. In order to maximize the index difference between the two layers 610 and 620 of the pixels' diffractive micro optical elements 250-4, it would be beneficial in this case for the top layer 620 to be an air gap. In this case, the cover glass layer 235 would be bonded on top side of the SSL imager 200 with the addition of spacers that would allow a thin air gap layer 620 between the high index layer 610 and the glass cover 235. In order to further maximize the field of view (FOV) realizable by the SSL imager 200 directional modulation groups 270 of this embodiment, it would also be possible to etch the diffractive micro optical elements' 250-4 lower layer 610 surface directly into the top side 230 of the photonic layer 215 of the SSL imager 200 pixels since, as explained earlier, the photonic layer 215 is fabricated from III/V semiconductor material, such as gallium nitride (GaN) for example, which typically has high index of refraction. Similar to the previous case of this embodiment, in this case it would also be beneficial to maximize the realizable FOV even further by having the top layer 620 of the diffractive micro optical elements 250-4 be an air gap layer. In this case also, the cover glass layer 235 would be bonded on top side of the SSL imager 200 with the addition of spacers that would allow a thin air gap layer between the high index layer 610 and the glass cover 235.

Figure 6C:
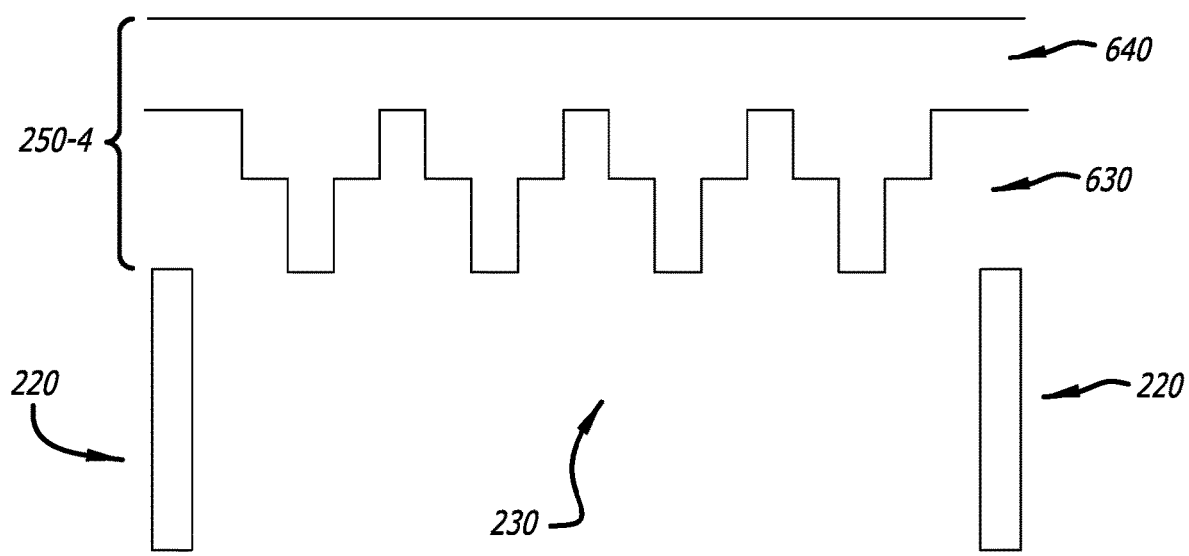
FIG. 6C illustrates an example of the case when multi-level gratings are used to realize the desired diffraction angle across the multiple wavelengths light emission bandwidth of the SSL imager pixels.

As explained earlier, the SSL imager 200 pixels can emit light with multiple wavelengths from each pixel aperture. In the case when the SSL imager 200 pixels emit light with multiple wavelengths, the diffractive optical elements 250-2 would be realized using wideband transmission gratings or multi-level gratings designed to achieve the desired diffraction angle across the light emission bandwidth of the SSL imager 200 pixels. In the case when wideband transmission gratings are used, the SSL imager 200 pixels diffractive optical elements 250-2 could be realized using a multiplicity of layers of dielectric materials with alternating high and low indexes for each such layer index. The index of such layers together with the formed grating slant angle and pitch would be selected to realize the desired pixel's diffractive angle within each sub-band of the SSL imager 200 pixels' light emission bandwidth. FIG. 6C illustrates an example of the case when multi-level gratings are used to realize the desired diffraction angle across the multiple wavelengths light emission bandwidth of the SSL imager 200 pixels. In this example case, two dielectric layers 630 and 640 with differing indexes are used to form a multi-level grating with a different grating pitch within each layer whereby the grating pitch of each layer being designed to dominantly diffract light within a given sub-band of the SSL imager 200 pixels light emission bandwidth. The pitch and index of each of the two layers 630 and 640 would be selected through an iterative design process that would take into account the collective diffractive action of the grating multi-level across the entire multiple wavelength emission bandwidth of the SSL imager 200 pixels. In the example of FIG. 6C, the index of the layer 630 would preferably be selected to match the index of the pixel's photonic layer 205. In addition, it would be possible to have the high index layer 630 be the top layer of the SSL imager 200 pixels in order to maximize the pixel's diffraction angular extent and consequently the realizable field of view (FOV) of the SSL imager 200 directional modulation groups 270. In this embodiment, the cover glass layer 235 would be bonded on top side of the SSL imager 200 with the addition of spacers that would allow a thin air gap layer between the high index layer 630 and the glass cover 235.

Directional Modulation Layer 245 Fabrication Method—As explained earlier, the pixel level micro optical elements 250 of the previous embodiments would be used to directionally modulate, collect and/or collimate the light emitted from their corresponding emissive micro pixels 205 and as such would have optical apertures which are equal to and precisely aligned, within at least less than 10% accuracy, with their corresponding micro pixels 230 of the non-telecentric emissive micro pixel light modulator (SSL imager) 200 of this invention. The pixel level micro optical elements 250 of the previous embodiments can be fabricated using a variety of nano-imprint lithographic techniques such as patterning using Phase, Grayscale, entire domain or sub domain masks, additive lithographic sculpting that use binary masks as well as various direct write techniques. Photo resist (heat) reflow and molding could also be employed for fabrication of the micro optical elements 250 to increase the smoothness of the formed surfaces. Additive Lithography using a sub domain binary mask set will be used herein as an example to illustrate a typical method for the fabrication of exemplary ROE pixel level micro optical elements 250 of the non-telecentric emissive micro pixel light modulator (SSL imager) 200 of this invention.

Figure 7A:
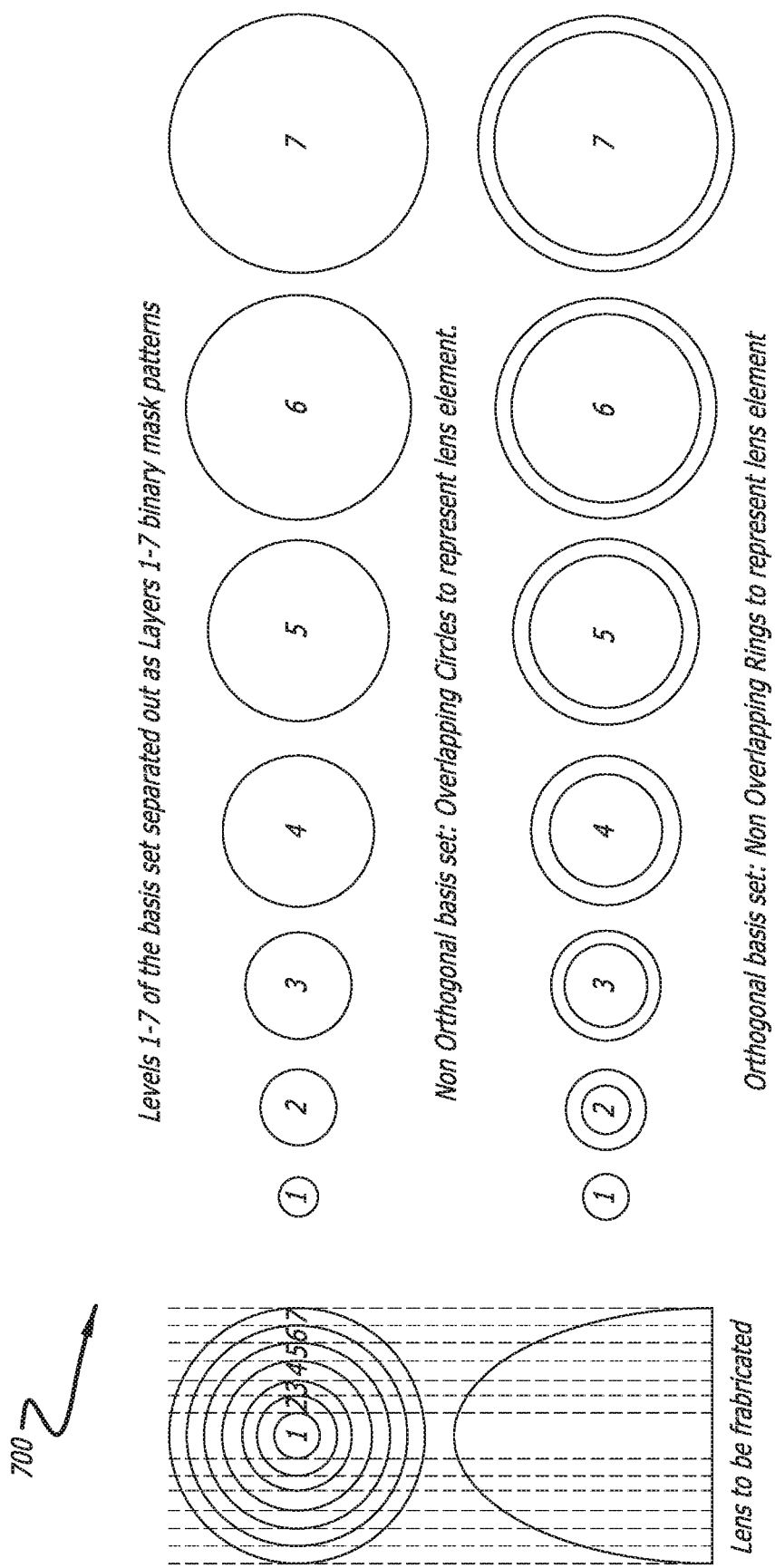
FIG. 7A illustrates a wafer level optics (WLO) fabrication process of the pixel level micro optical elements of the non-telecentric emissive micro pixel light modulator of this invention.
Figure 7B:
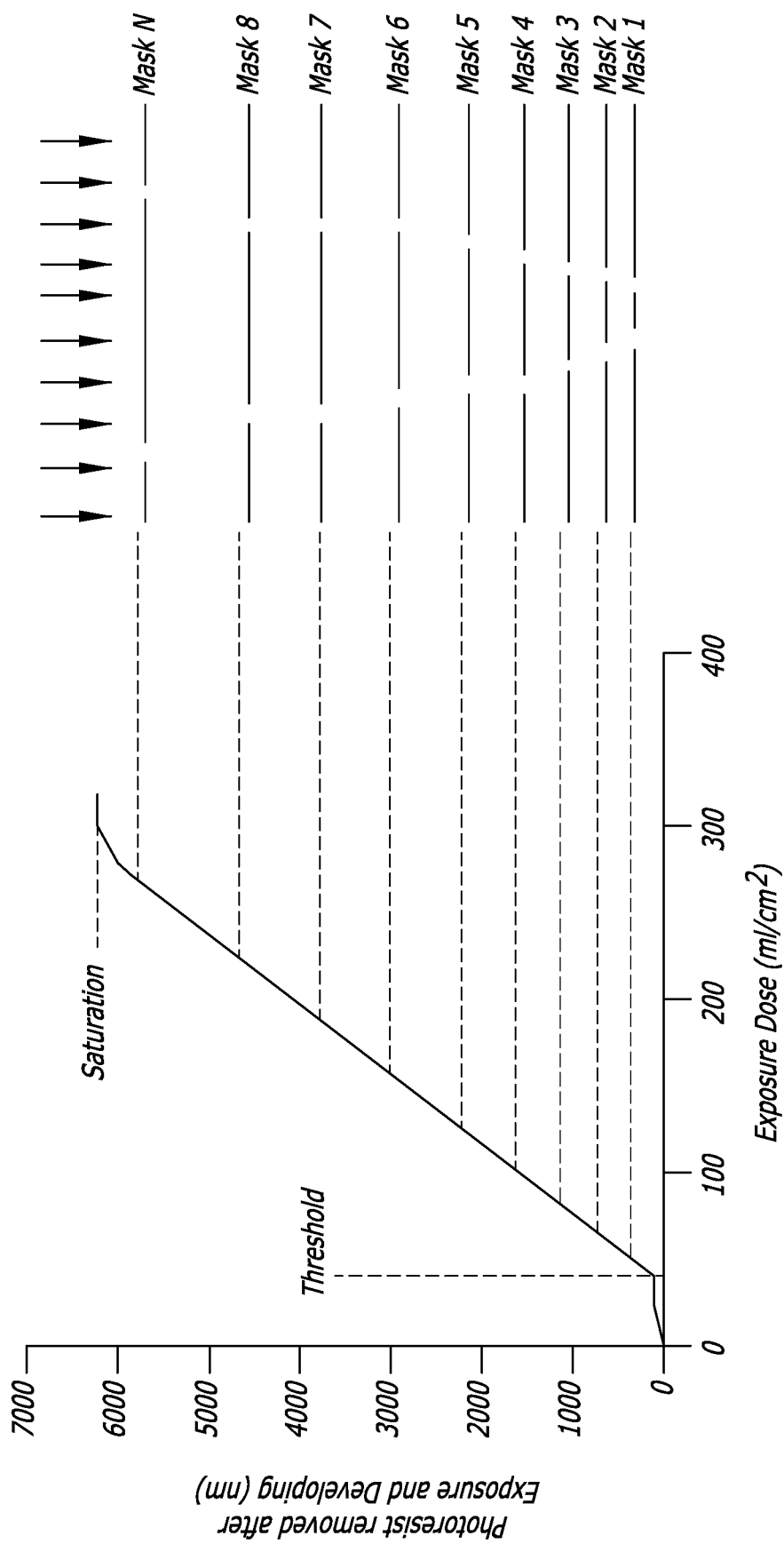
FIG. 7B illustrates a lithographic mask set used in the wafer level optics (WLO) fabrication process of the pixel level micro optical elements of the non-telecentric emissive micro pixel light modulator of this invention.

Wafer Level Optics Mask Set—The fabrication process sequence of the pixel level micro optical elements 250 begins with the fabrication of a set of lithography sub domain masks that captures the binary shape specifications of the micro optical elements 250. The fabrication process of the sub domain masks involves identifying the symmetry within the specified features of the pixel level micro optical elements 250 to be fabricated and breaking down the identified symmetry to an orthogonal or non orthogonal set of basis. FIG. 7A illustrates the orthogonal and non orthogonal basis set for an exemplary rotationally symmetric pixel level refractive micro optical elements 250 generated by this process. The specified binary surface shape of the micro optical elements 250 will be achieved later during the fabrication process by controlling the exposure dose of each element of the orthogonal or non orthogonal basis set during lithography as illustrated in FIG. 7B.

Figure 7C:
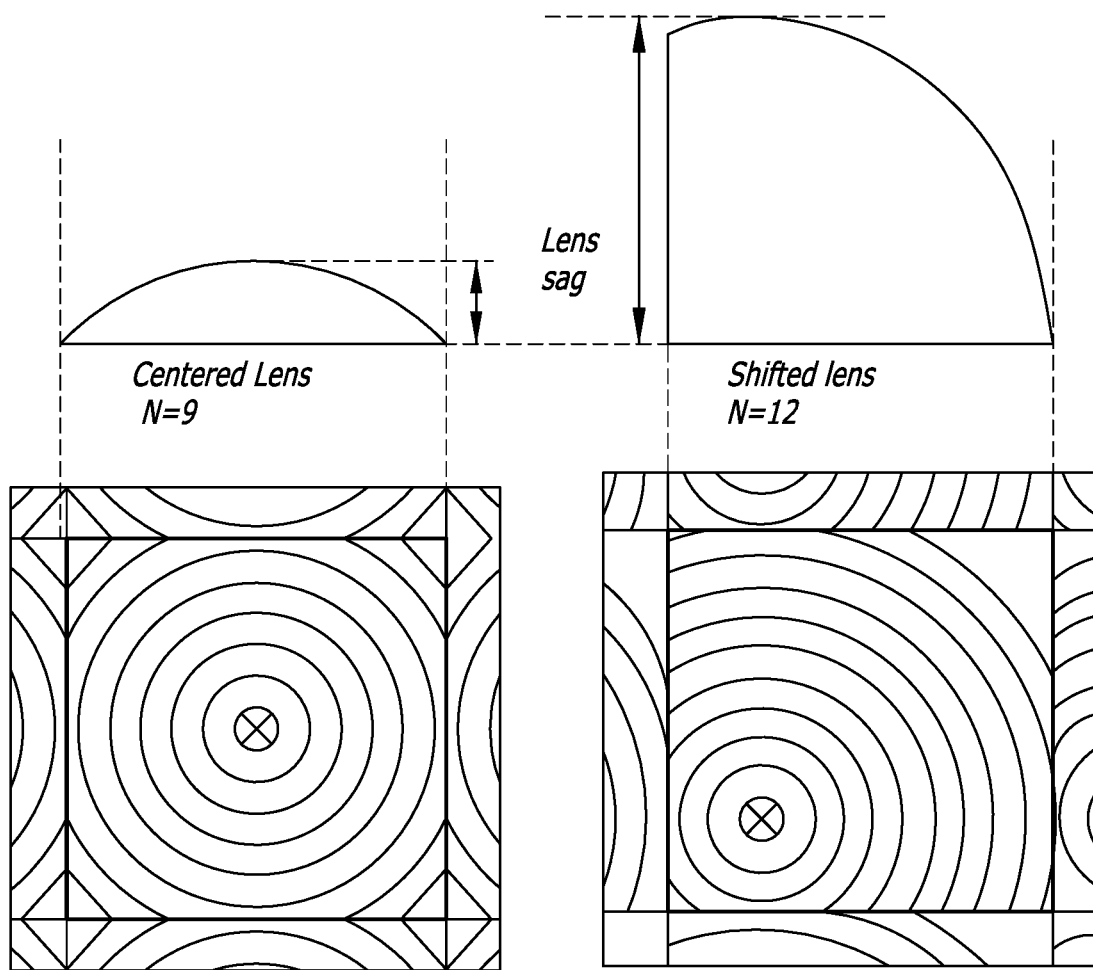
FIG. 7C illustrates a wafer level optics (WLO) fabrication process of a de-centered pixel level micro optical elements of the non-telecentric emissive micro pixel light modulator of this invention.
Figure 7D:
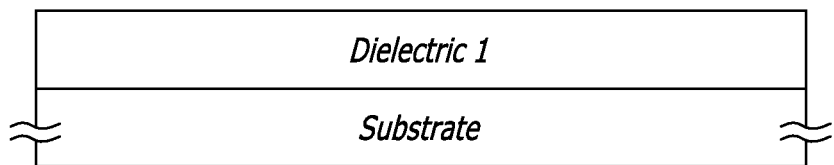
FIGS. 7D-7M illustrate a wafer level optics (WLO) fabrication process sequence of the pixel level micro optical elements of the non-telecentric emissive micro pixel light modulator of this invention.

As illustrated in FIG. 7A, the rotationally symmetric refractive micro optical elements 250 would be represented by the two dimensional basis set of orthogonal (rings) or non orthogonal (circles) elements. For realizing the pixel level micro optical elements 250 as a de-centered ROC of the previous embodiment, at each micro pixel 230 position, the required de-centering shift is applied to the generated basis set and then truncated accordingly after each of the basis is aligned with the micro pixel 230 aperture specified by the design. FIG. 7C illustrates two example cases, one where the micro optical elements 250 axis lies at the center of the aperture of the micro pixel 230 and a second case where the micro optical elements 250 axis is shifted from the center of the aperture of the micro pixel 230. This process is then repeated across the entire array of micro pixels 230 mask alignment reference coordinates to create a multilayer mask set for the full aperture of the emissive micro pixel light modulator (SSL imager) 200 device. Equivalent orthogonal and non-orthogonal basis elements are then aligned with the array of emissive micro pixel 230 mask alignment reference coordinates across the SSL imager 200 aperture to form separate mask layers. These mask layers can then be separated and placed on well known locations on a single reticle or on multiple reticles to be used in the wafer level micro optics lithography fabrication process of the micro optical elements 250. This entire process of masking layers formation can be accomplished using a standard mask editing software such as LEdit typically used in the creation of semiconductors lithography masks. It should be noted that this mask formation process would be repeated for every optical surface comprising the pixel level micro optical elements 250 to create a full mask set for the wafer level optic fabrication of the non-telecentric emissive micro pixel light modulator (SSL imager) 200.

Although the preceding discussion outlined the process of forming the lithography mask set for the case when the pixel level micro optical elements 250 are realized in accordance with the embodiment described earlier as a de-centered ROE, a person skilled in the art will readily know how to apply the described lithography mask set formation process in the cases of other described embodiments when the micro optical elements 250 are realized as tilted ROE or as a DOE.

Wafer Level Optics Fabrication Sequence—FIGS. 7D-7M illustrate the fabrication process sequence of the pixel level micro optical elements 250. After the wafer level optics mask set is formed in accordance with the preceding discussion, a substrate of choice is coated with a thin layer, preferably few microns, of a dielectric material, herein referred to as dielectric-1 (FIG. 7D), using semiconductor material deposition tools such as plasma enhanced chemical vapor deposition (PECVD). The deposited dielectric-1 layer could be amorphous but needs to be sufficiently transparent within the target optical spectrum, for example within the visible light 400 nm to 650 nm spectrum and specifically selected to introduce minimal stresses on the substrate wafer. The deposited dielectric-1 layer would typically be the low index material surrounding other high index material layers that would comprise the pixel level micro optical elements 250. Alignment marks are then patterned onto the topside of the deposited dielectric-1 layer to be used for aligning subsequent layers of the pixel level micro optical elements 250.

Figure 7E:
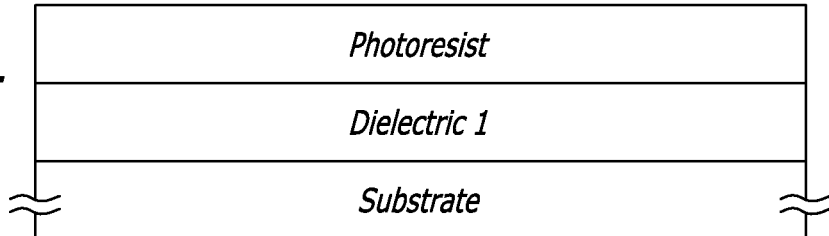
Figure 7F:
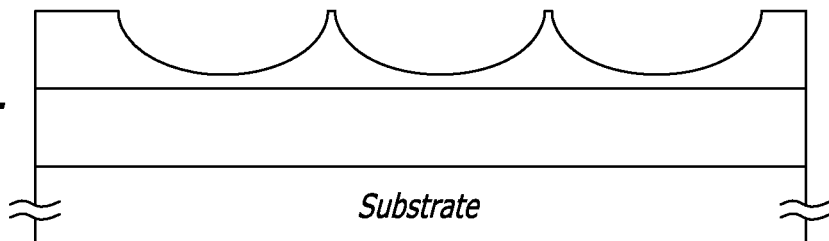

A photoresist appropriately chosen and characterized is then coated on top of dielectric-1 layer and Additive Lithography is performed using the fabricated mask set to create a negative of that surface of the pixel level micro optical elements 250 (FIG. 7E). In the Additive Lithography process, the negative surface would be created on the photoresist layer by the successive alignment and exposure using the various masks of the set with an alignment tolerance of less than 100 nm or preferably in the range of 50 nm (FIG. 7F). The created shape of the photoresist surface would be optimized by adjusting the exposure and focus offset parameters for each of the lithographical steps for the various masks of the set as illustrated in FIG. 7B. This step is followed by the appropriate metrology measurements to confirm that the created photoresist negative surface is compliant with the surface design specification (or optical prescription) of the $1^{st}$ surface of the pixel level micro optical elements 250.

Figure 7G:
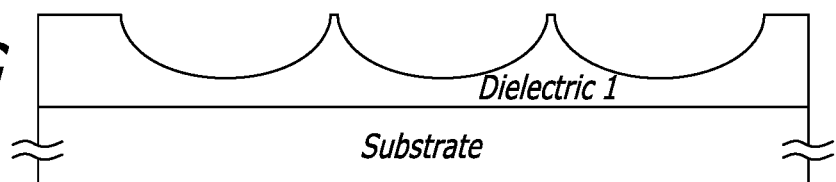

Once the specification compliance of the photoresist negative surface is confirmed, the micro optical elements 250 would be etched using the appropriate chemistry on a reactive ion etching (RIE) tool that can provide 1:1 selectivity between the photoresist and the dielectric-1 layers (FIG. 7G). Etching time needs to be adjusted based on pre-characterized etch rate in order to avoid over-etching into the dielectric-1 layer and to ensure that the shape on the photoresist is faithfully transferred on the dielectric-1 layer with minimal defects formed during the etching step. A metrology measure following this step is used to confirm the dielectric-1 layer etched surface is compliant with the surface design specification (or optical prescription) of the micro optical elements 250. After the etch and metrology steps, the wafer dielectric-1 layer surface is thoroughly cleaned to ensure removal of all polymer residues and other contaminants from the fabricated surface of the wafer. At the end of this step, the first surface of the micro optical elements 250 would be created on the dielectric-1 layer in accurate alignment with the micro pixels 230 across the entire wafer surface with the created optical surface.

Figure 7H:
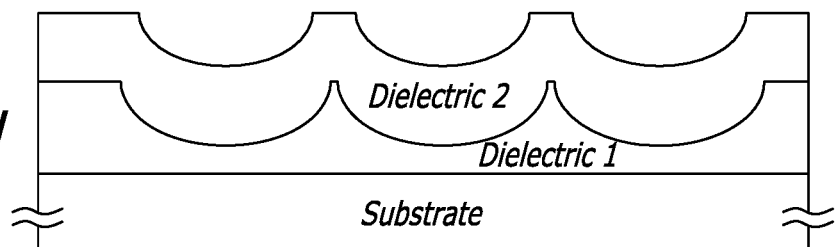
Figure 7I:
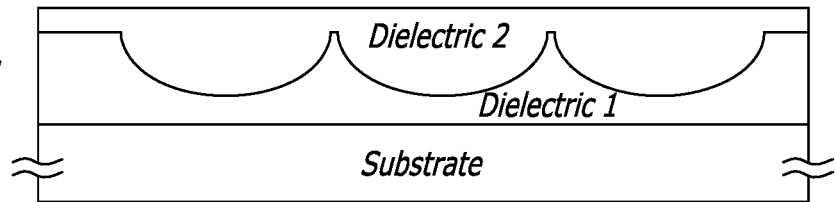
Figure 7J:
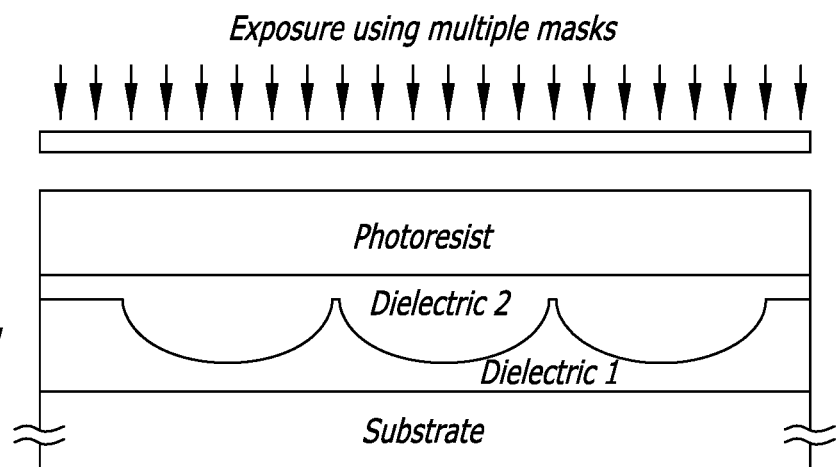

After the dielectric-1 layer surface is fabricated, the wafer is coated with a relatively thick conformal layer of a high index dielectric-2 layer (FIG. 7H). The thickness of dielectric-2 layer should be sufficient to accommodate the optical features of the micro optical elements 250 while being highly transparent with minimal stress. The deposited surface of the dielectric-2 layer then undergoes a planarization process using chemical mechanical polishing (CMP) tool to obtain a nearly flat surface across the wafer with minimal total thickness variation (TTV) (FIG. 7I). The dielectric-2 layer wafer surface is then coated with photoresist then processed, in similar steps as described for dielectric-1 layer, using Additive Lithography followed by etching to create the $2^{nd}$ surface of the pixel level micro optical elements 250 on the dielectric-2 layer surface (FIG. 7J-L).

Figure 7K:
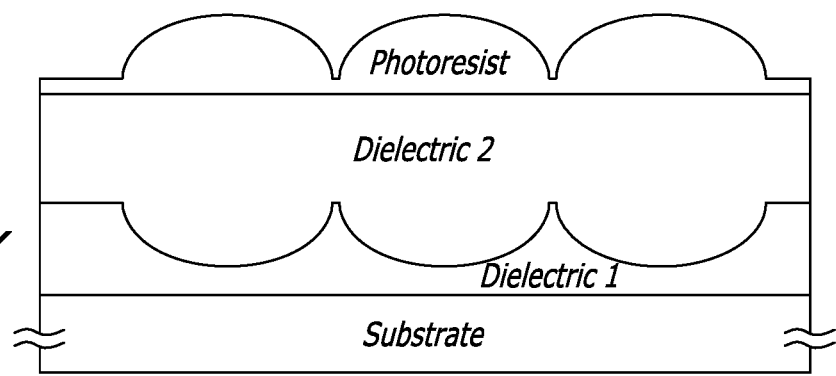
Figure 7L:
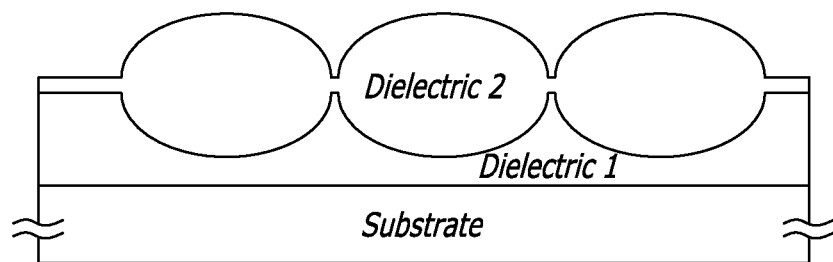
Figure 7M:
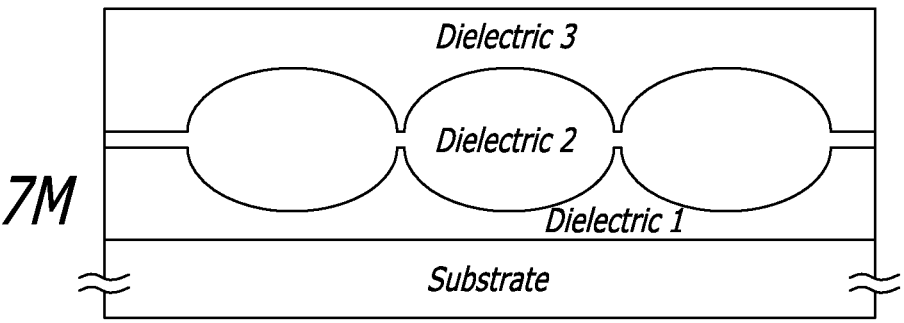

After the fabrication of the $1^{st}$ and $2^{nd}$ surfaces of the pixel level micro optical elements 250 as shown in FIGS. 7K and 7L, a third layer of dielectric material, designated as dielectric-3 layer, is deposited on the top of the wafer surface and planarized to the required thickness and TTV specifications (FIG. 7M). The dielectric constant and index of refraction of the dielectric layers dielectric-1, dielectric-2 and dielectric-3 would be selected based on the optical prescription of the pixel level micro optical elements 250 and typically in most applications dielectric-1 and dielectric-3 would have the same index of refraction value that lower than dielectric-2 index of refraction value.

The described WLO fabrication steps would be repeated on the top of dielectric-3 layer wafer surface if a second optical element is to be added in accordance with the optical prescription of the pixel level micro optical elements 250.

After all the optical elements of the pixel level micro optical elements 250 are fabricated on top of the substrate wafer, the wafer surface is coated with a bonding intermediary layer, polished to the appropriate bonding specification then aligned bonded, using the alignment marks added earlier in the process, to the top photonic layer 205 surface.

In one embodiment of this invention, the WLO fabrication process described in the preceding paragraphs is used to fabricate the pixel level micro optical elements 250 on the top of the cover glass wafer 235 as a substrate then the fabricated wafer is used as a substrate upon which the pixelated photonic layers stack 205 would be bonded and formed sequentially. At the end of that fabrication sequence, the formed wafer would be aligned bonded to the topside of the CMOS control layer 225.

In another embodiment of this invention, the WLO fabrication process described in the preceding paragraphs is used to fabricate the pixel level micro optical elements 250 on top of the cover glass wafer 235 as a substrate then the fabricated wafer is aligned bonded to the photonic layer 205 top surface of the wafer formed separately that comprises the photonic layer stack 205 bonded sequentially to the topside of the CMOS control layer 225.

In yet another embodiment of this invention, the WLO fabrication process described in the preceding paragraphs is used to fabricate the pixel level micro optical elements 250 on top of the wafer formed separately that comprises the photonic layer stack 205 bonded sequentially to the topside of the CMOS control layer 225, then the cover glass wafer is bonded on the top of the fabricated pixel level micro optical elements 250. In the WLO fabrication process for this case, the $2^{nd}$ surface of the pixel level micro optical elements 250 will be fabricated first on top of the pixelated photonic layers stack 205, then the $1^{st}$ surface of the pixel level micro optical elements 250 would be fabricated on top. In still other embodiments, particularly using other fabrication processes described herein for the directional modulation layers and using this fabrication process, the glass cover layer 235 would be bonded on the top side of the SSL imager 200 with the addition of spacers that would allow a thin air gap layer 620 between the high index layer 610 and the glass cover 235. Each of the aforementioned embodiments would have its advantages depending on the intended application.

FIGS. 7D-7M illustrate the WLO fabrication process described in the preceding paragraphs to fabricate the pixel level micro optical elements 250 on the on top of the cover glass wafer 235 as a substrate. Although FIGS. 7D-7M illustrate the described the WLO fabrication process in the case of the pixel level micro optical elements 250 being a ROE fabricated on top the glass cover wafer 235 as a substrate, the described fabrication sequence equally applies in the case of the numerous embodiments described including the case when the pixel level micro optical elements 250 being a DOE fabricated within the context of any of the WLO fabrication process embodiments of the previous paragraphs.

Figure 8A:
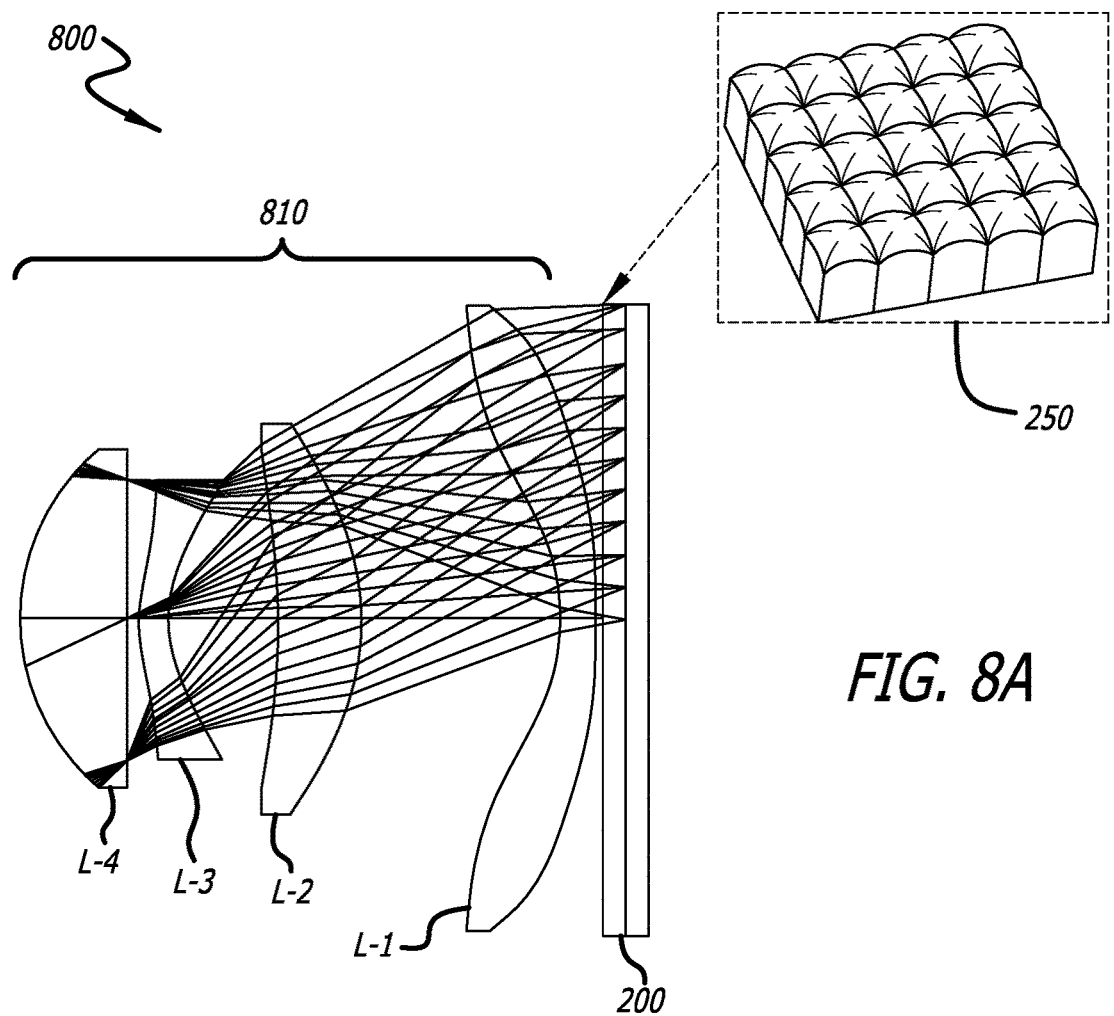
FIG. 8A illustrates a design method of an ultra compact display projector enabled by the non-telecentric emissive micro pixel light modulator of this invention.
Figure 8C:
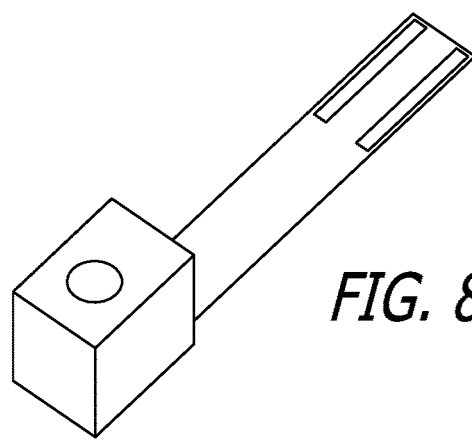
FIG. 8C illustrates the superior volumetric efficiency of the ultra compact display projector of FIG. 8A enabled by the non-telecentric emissive micro pixel light modulator of this invention.
Figure 8B:
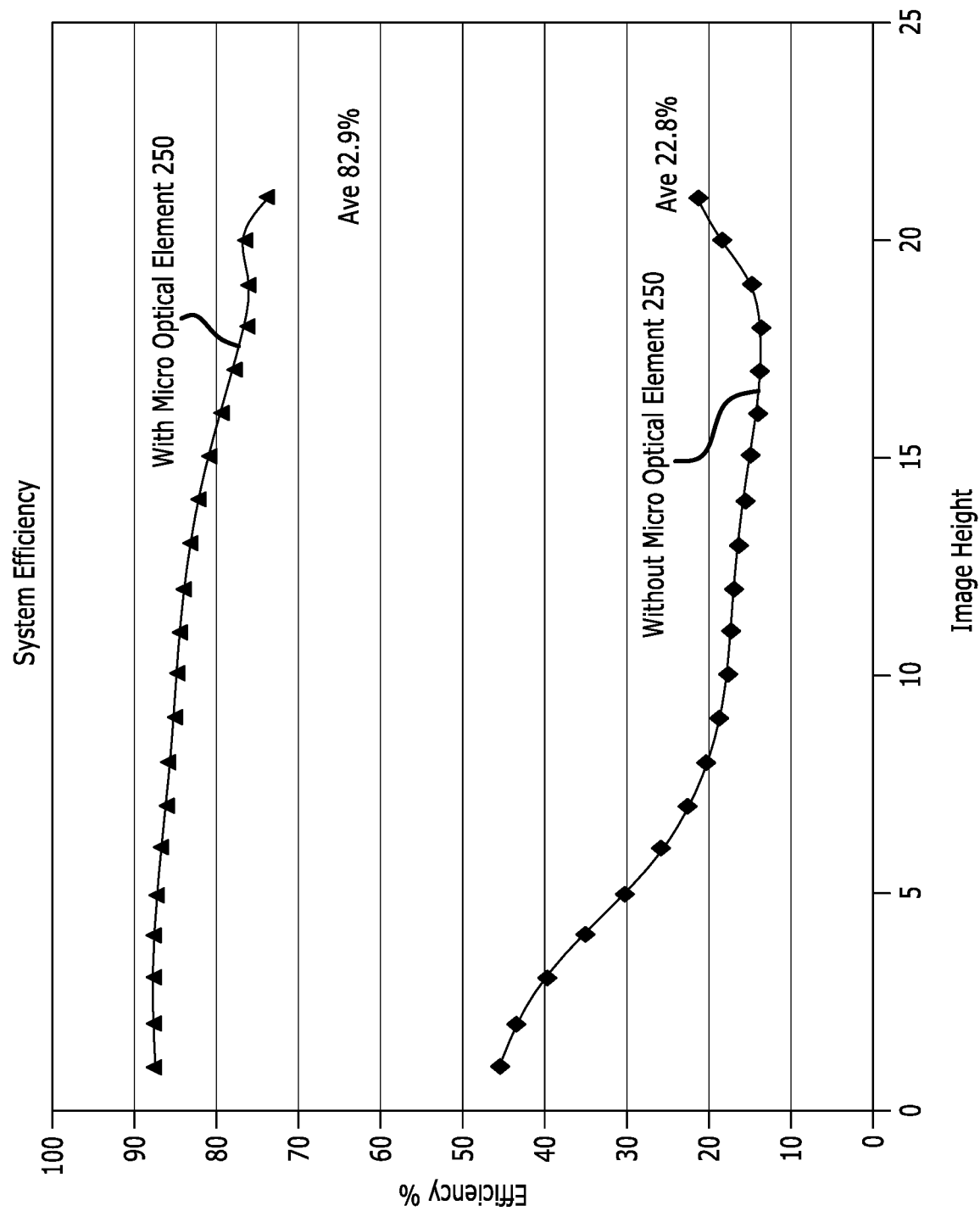
FIG. 8B illustrates the superior optical efficiency and uniformity of the ultra compact display projector of FIG. 8A enabled by the non-telecentric emissive micro pixel light modulator of this invention.

Ultra Compact Projector—FIG. 8A illustrates a design method of an ultra compact display projector enabled by the non-telecentric emissive micro pixel light modulator (SSL imager) 200 of the embodiments herein. In this embodiment, the directional modulation layer 245 of the SSL imager 200 is designed to realize a convergent directional modulation pattern causing the light emitted from the directional modulation group 270 of micro pixels 210 to directionally converge systematically toward the perpendicular axis from the peripheral edges of the directional modulation group 270 toward its center. In this case, the directional modulation group 270 extends across the entire emissive optical aperture of the SSL imager 200. As illustrated in FIG. 8A, the pixel level micro optical elements 250 would directionally modulate the light emitted from SSL imager 200 micro pixels to achieve maximum fill factor of the optical aperture of the first optical element L-1 of the projection optics 810 which in turn is designed to further redirect the light rays toward the second optical element L-2 optical aperture while maintaining the fill factor at a maximum. Optical elements L3 and L4 are used for magnification of the projected image. The projector design of this embodiment achieves less than an 8 mm optical track length with a 3.6×6.4 mm SSL imager emissive aperture size while achieving a fairly uniform optical efficiency. The actual projector has cross-sectional dimensions of 5.82 mm×8.05 mm, with a height of 7.86 mm. Besides its volumetric efficiency, the ultra compact display projector of FIG. 8A would enable the attainment of high optical efficiency and brightness uniformity. As shown in FIG. 8B, the projector design of this embodiment achieves almost 83% optical efficiency with less than 15% center to corner roll off compared to 22.8% optical efficiency for a design that does not use the non-telecentric emissive micro pixel light modulator (SSL imager) 200 of the embodiments herein. With the minimal optical track length it achieves, the projector design of this embodiment was used to fabricate the ultra compact, full color projector pictured in FIG. 8C having a total volume of less than 0.3 cc. To the best of the inventors' knowledge, this is volumetrically the smallest HD projector ever designed and fabricated, which makes it ideal for mobile display applications such as embedded and attached mobile projectors as well as near-eye head mounted displays (HMD).

Figure 9:
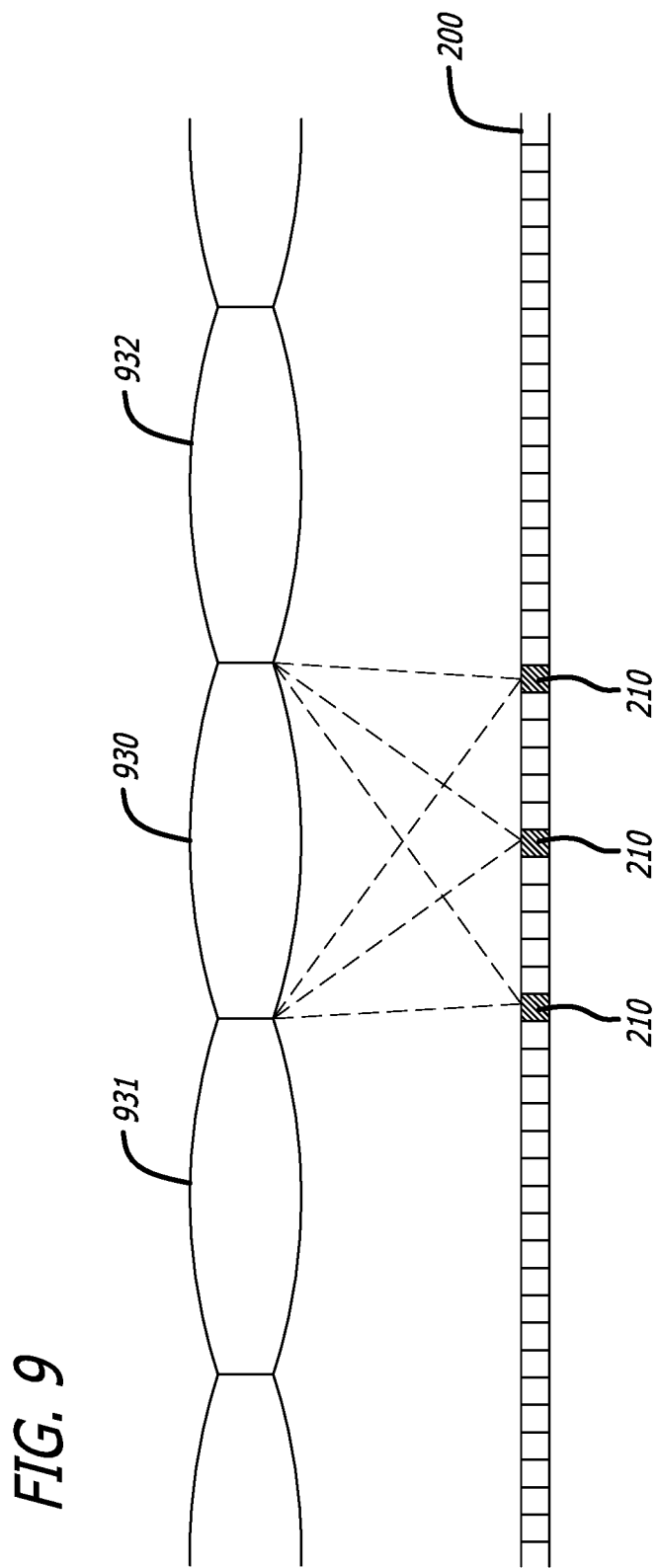
FIG. 9 illustrates a design method of a minimum cross-talk light field modulator enabled by the non-telecentric emissive micro pixel light modulator of this invention.

Minimum Cross-Talk Light Field Modulator—FIG. 9 illustrates a design method of a minimum cross-talk light field modulator enabled by the non-telecentric emissive micro pixel light modulator (SSL imager) 200 of this invention. In this embodiment the "cross-talk" between holographic elements (hogels) and the undesirable 3D image "ghost" distortions it causes would be substantially reduced or eliminated altogether by making the SSL imager 200 emission non-telecentric across the optical apertures of each of the hogel lenses 930-932 as illustrated in FIG. 9. That is to say in this embodiment, the directional modulation layer 245 of the SSL imager 200 would be designed to realize a convergent directional modulation pattern causing the light emitted from the directional modulation group 270 of micro pixels 210 to directionally converge systematically toward the perpendicular axis from the peripheral edges of the directional modulation group 270 toward its center. In the case of this embodiment, the directional modulation group 270 would extend across the sub-array of SSL imager 200 emissive micro pixels corresponding to (or associated with) the optical aperture of each of the hogel lenses 930-932 of FIG. 9. With the design method of this embodiment the pixel level micro optical elements 250 of the SSL imager 200 sub-array of micro pixels 210 associated with each of the hogel lenses 930-932 would be designed such that the light emission from the sub-array of micro pixels 210 would remain substantially confined within the optical apertures of their associated hogel lenses 930-932 apertures, thus minimizing the light leakage or cross-talk between adjacent the hogel lenses 930-932. With that being achieved, the light leakage between light field views modulated by the SSL imager 200 would be minimized, making the views from different directions having no ghost interference from other directions.

In this embodiment, the light emitted from each of the SSL imager 200 micro pixels 210 would be sufficiently collimated and directionally modulated (or directed) by the pixel's micro optical elements 250 to efficiently fill in their associated hogel lens with minimal or substantially no light leakage into adjacent hogel lenses. Thus in addition to minimizing the cross-talk between directionally modulated views, the directional light modulator of FIG. 9 enabled by the non-telecentric emissive micro pixel light modulator (SSL imager) 200 of this invention would also achieve higher optical efficiency and uniformity across its field of view (FOV).

Figure 10B:
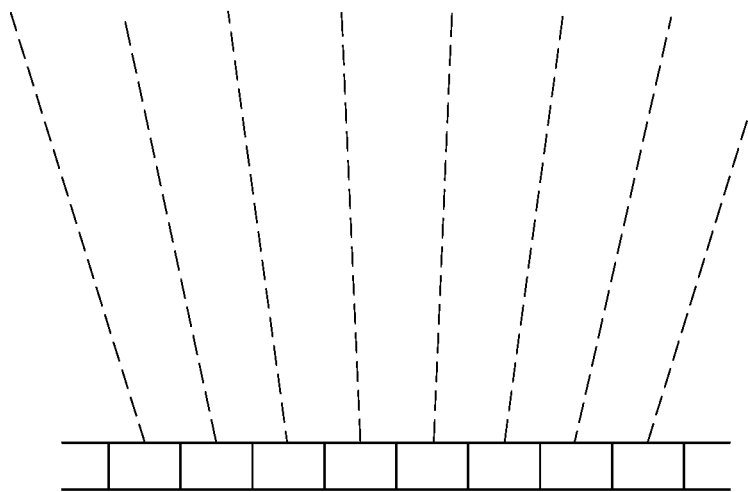
FIG. 10B illustrates a side view of a multi-view 2D display enabled by the non-telecentric emissive micro pixel light modulator of this invention.
Figure 10A:
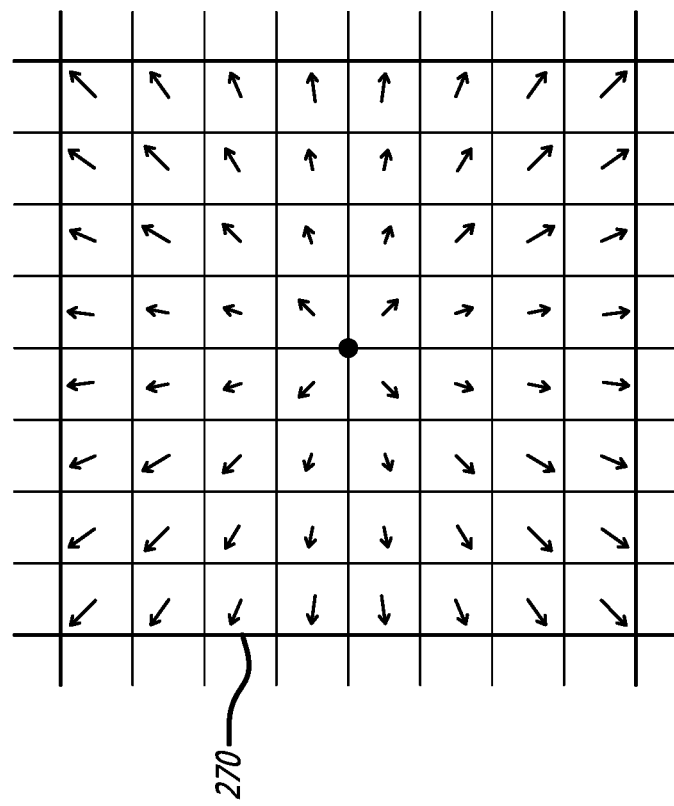
FIG. 10A illustrates a top view of a multi-view 2D display enabled by the non-telecentric emissive micro pixel light modulator of this invention.

Multi-View Display—FIG. 10A and FIG. 10B illustrate a top view and side view, respectively, of a multi-view 2D display design method enabled by the non-telecentric emissive micro pixel light modulator (SSL imager) 200 of this invention. In this embodiment, the SSL imager 200 emissive pixels 210 array and their associated micro optical elements 250 of the directional modulation layer 245 would be spatially partitioned into directional modulation sub-arrays or directional modulation groups 270. As illustrated in FIG. 10B the directional modulation layer 245 of the SSL imager 200 of this embodiment may be designed to realize a divergent directional modulation pattern that would cause the light emitted from the directional modulation group 270 of micro pixels 210 to directionally diverge systematically into a unique set of directions away from the perpendicular axis of the directional modulation group 270. In this embodiment, the size of the directional modulation group 270 in terms of the number of emissive pixels 210 will determine the number of views that can supported by the multi-view display. For example, a 64-view multi-view display can be realized using an 8×8 directional modulation group 270 of FIG. 10A with each of the pixels in each of the modulation groups across the display aperture being designed to emit light in a unique direction that is uniformly and angularly spaced within the targeted field of view (FOV) of the multi-view display. In this embodiment, the light emitted from each of the SSL imager 200 micro pixels 210 would be sufficiently collimated and directionally modulated to a specific unique direction by the pixel's micro optical elements 250.

Figure 11A:
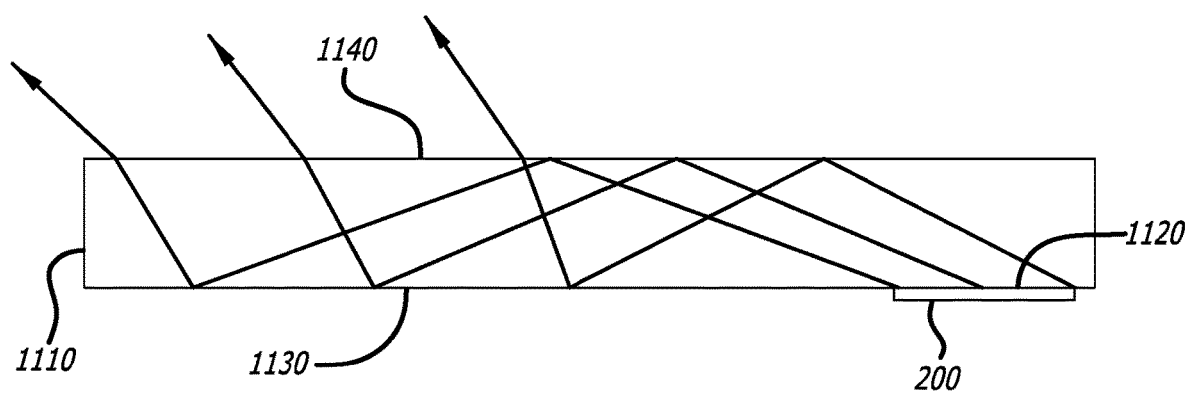
FIG. 11A illustrates a side view of a waveguide light modulator enabled by the non-telecentric emissive micro pixel light modulator of this invention.

Waveguide Light Modulator—FIG. 11A illustrates a design method of a Waveguide Light Modulator enabled by the non-telecentric emissive micro pixel light modulator of this invention. As illustrated in FIG. 11A, the Waveguide Light Modulator of this embodiment would be comprised of the SSL imager 200 with its directional modulation layer coupled onto the optical input aperture 1120 of the waveguide 1110 which has the reflective optics layer 1130 coated to one of its sides to define its optical output aperture 1140. In this embodiment the SSL imager 200 emissive pixels 210 array and their associated micro optical elements 250 of the directional modulation layer 245 would direct the light emitted from each of the SSL imager 200 pixels in a unique direction within the waveguide angular range of the waveguide 1110. In the case of a total internal reflection (TIR) waveguide 1110, such as that illustrated in the FIG. 11A, the light emitted from each of the SSL imager 200 pixels would be directionally modulated by the pixel's associated micro optical elements 250 in a unique direction within the tangential (lateral) and vectorial (elevation) planes that will set forth the wave guiding angle of the light emitted from that pixel as well as the lateral divergence from the pixel's (x, y) coordinates. The directional modulation of the light emitted by the SSL imager 200 pixels in lateral plane would serve to determine the total expansion (or magnification) of the image being modulated by the SSL imager 200 pixel array as the light emitted from its pixel array propagate through the waveguide. In effect the directional modulation of the light emitted by the SSL imager 200 pixels in lateral plane would serve to determine the x-axis magnification factor of the image being modulated by the SSL imager 200 pixel array and coupled into the waveguide. The directional modulation of the light emitted by the SSL imager 200 pixels in vectorial plane would serve to determine the angle at which the light emitted (and modulated) from each of the SSL imager 200 pixels would propagate through the waveguide. With the waveguide reflective optics layer 1130 typically being designed to break the TIR condition for light rays being guided through the waveguide at progressively lower angle further away from the waveguide input optical aperture 1120 into which the SSL imager 200 is optically coupled, the light emitted by the SSL imager 200 pixels and directionally modulated by its micro optical elements 250 in vectorial plane at a progressively smaller angles within the waveguide TIR angular range would propagate further away from waveguide input optical aperture 1120 before its TIR guiding condition is broken (collapsed) by the waveguide reflective optics layer 1130 directing the light more directly toward the output aperture 1140 of the waveguide 1110. In effect the directional modulation of the light emitted by the SSL imager 200 pixels in vectorial plane would serve to determine the y-axis magnification factor of the image being modulated by the SSL imager 200 pixel array and coupled into the waveguide. When the directional modulation of the light emitted by the SSL imager 200 pixels in the tangential (lateral) and vectorial planes are properly selected for each of its pixels, the directional modulation of the light emitted by the SSL imager 200 of this invention would enable the magnification and relay of the image it is modulating and coupling into the waveguide input optical aperture 1120 to the waveguide output optical aperture 1140. As an alternative, the output aperture may itself include transmissive optics to break the TIR condition at the output aperture 1140.

Figure 11B:
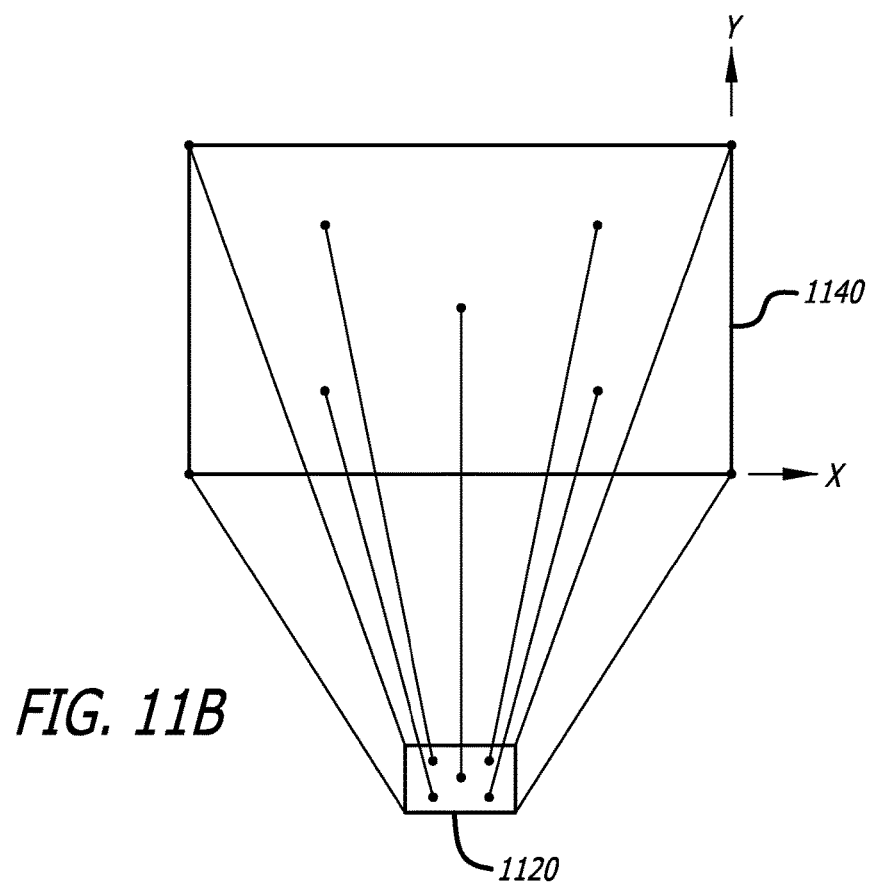
FIG. 11B illustrates a top view of a waveguide light modulator enabled by the non-telecentric emissive micro pixel light modulator of this invention.

The directional modulation design method of this embodiment is further illustrated in FIG. 11B which shows a top view of the SSL imager 200 enabled Waveguide Light Modulator of this invention. In FIG. 11B the SSL imager 200 pixels' coordinates within the waveguide input optical aperture 1120 are designated as (x, y) coordinates while the Waveguide Light Modulator pixels' coordinates within the waveguide output optical aperture 1140 are designated as (X, Y) coordinates. As illustrated in FIG. 11B, the SSL imager 200 pixels directional modulation angles in the lateral and vectorial planes cause the light emitted from each of the SSL imager 200 pixels and coupled into the waveguide at a given (x, y) coordinates within the waveguide input optical aperture 1120 to be uniquely mapped to given (X, Y) coordinates within the waveguide output optical aperture 1140. In effect the SSL imager 200 pixels' directional modulation method of this embodiment together with an appropriately designed waveguide reflective optics layer 1130 would enable the synthesis of a given optical transfer function that realizes both magnification and relay between the waveguide input and output optical apertures 1120 and 1140; respectively. It should be added that in this embodiment, the collimation angle of the light bundles emitted by the SSL imager 200 pixels would be selected to be outside the TIR angular range of the waveguide 1110 for proper functioning of the output aperture 1140 without special provisions for the emission.

Figure 11C:
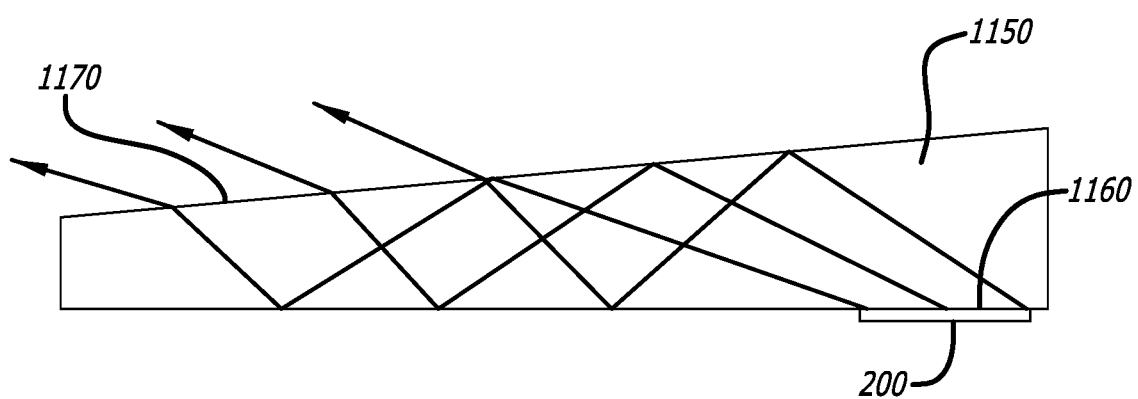
FIG. 11C illustrates a side view of a tapered waveguide light modulator enabled by the non-telecentric emissive micro pixel light modulator of this invention.

Tapered Waveguide Light Modulator—In an alternative embodiment, illustrated in FIG. 11C, the SSL imager 200 based Waveguide Light Modulator may be realized using the tapered waveguide 1150 whereby the tapering angle (or slope) of one surface of the waveguide 1150 is selected to break the TIR condition for light rays being guided through the waveguide 1150 at a progressively lower angle (closer to a line perpendicular to the local waveguide surface) further away from the waveguide input optical aperture 1160 into which the SSL imager 200 is optically coupled. The tapering of one surface of the waveguide 1150 in this embodiment performs the equivalent optical function of the diffractive optics layer 1130 of the previous embodiment. In this embodiment, the SSL imager 200 emissive pixels 210 array and their associated micro optical elements 250 of the directional modulation layer 245 would direct the light emitted from each of the SSL imager 200 pixels in a unique direction within the waveguide angular range of the tapered waveguide 1150. As illustrated in the FIG. 11C, the light emitted from each of the SSL imager 200 pixels would be directionally modulated by the pixel's associated micro optical elements 250 in a unique direction within the tangential (lateral) and vectorial (elevation) planes that will set forth the wave guiding angle of the light emitted from that pixel as well as the lateral divergence from the pixel's (x, y) coordinates. The directional modulation of the light emitted by the SSL imager 200 pixels in the lateral plane would serve to determine the total expansion of the image being modulated by the SSL imager 200 pixel array as the light emitted from its pixel array propagates through the tapered waveguide 1150. In effect, the directional modulation of the light emitted by the SSL imager 200 pixels in lateral plane would serve to determine the x-axis magnification factor of the image being modulated by the SSL imager 200 pixel array and coupled into the waveguide. The directional modulation of the light emitted by the SSL imager 200 pixels in vectorial plane would serve to determine the angle at which the light emitted (and modulated) from each of the SSL imager 200 pixels would propagate through the waveguide. With the tapered surfaces of the waveguide 1150 being designed to break the TIR condition for light rays being guided through the waveguide at progressively lower angle (closer to a perpendicular to the local surface of the tapered waive guide 1150) further away from the waveguide input optical aperture 1160 into which the SSL imager 200 is optically coupled, the light emitted by the SSL imager 200 pixels and directionally modulated by its micro optical elements 250 in the vectorial plane at a progressively lower angles within the waveguide TIR angular range would propagate further away from waveguide input optical aperture 1160 before it's TIR guiding condition is broken (collapsed) by the tapered surface of the waveguide 1150. In effect, the directional modulation of the light emitted by the SSL imager 200 pixels in the vectorial plane would serve to determine the y-axis magnification factor of the image being modulated by the SSL imager 200 pixel array and coupled into the tapered waveguide 1150. When the directional modulation of the light emitted by the SSL imager 200 pixels in the tangential (lateral) and vectorial planes are properly selected for each of its pixels, the directional modulation of the light emitted by the SSL imager 200 of the embodiments herein would enable the magnification and relay of the image it is modulating and coupling into the tapered waveguide 1150 input optical aperture 1120 to the waveguide output optical aperture 1140. In effect the SSL imager 200 pixels directional modulation method of this embodiment together with an appropriately designed tapered waveguide 1150 would enable the synthesis of a given optical transfer function that realizes both magnification and relay between the tapered waveguide 1150 input and output optical apertures 1160 and 1170; respectively. It should be added that in this embodiment, the collimation angle of the light bundles emitted the SSL imager 200 pixels would be selected to be within the TIR angular range of the tapered waveguide 1150. As an alternate, certain surfaces of the tapered waveguide such as part of the lower surface of the tapered waveguide may be coated with a reflective coating, if desired, to allow a last reflection when the TIR condition has already been broken.

It should be noted that the two previous embodiments of the SSL imager 200 based Waveguide Light Modulator can be used to create optical see-through (OST) near-eye or head-mounted display (HMD). In each of these embodiments, as alternate embodiments, the SSL imager may instead have its output coupled into an input aperture at the end or edge of the waveguide 1110 and achieve the same or similar results. Also the waveguides themselves may have other shapes, and are not limited to rectangular shapes as shown.

Thus, using the wafer level fabrication techniques for the wafer level optics, the entire non-telecentric emissive micro-pixel array light modulator may be fabricated at the wafer level and then the wafer level assembly diced to obtain the final products.

Also, while FIG. 2C-1 illustrates an embodiment wherein the light converges from the center of the pixel group or the entire array, and FIG. 2C-2 illustrates an embodiment wherein the light diverges from the center of the pixel group or the entire array, neither are a limitation of the invention, as in some applications, light from all pixels in a group or the entire array may be directed in the same general direction, though normally in different angles to present the full image or images for viewing in an undistorted form. This may require a counter distortion at the directional modulator layer to achieve the undistorted image for viewing. Further, the directional modulation layer may include two or more distinct pixel groups, one for presenting a first image at one location or depth, and one or more other images at one or more additional location or locations or depths.

In the foregoing description and in the claims, reference is made to a directional modulation layer. It is to be understood that the word layer is used in a general sense to identify the layer or multiple layers that determine the spatial modulation of the non-telecentric emissive micro-pixel array light modulator. Also it should be understood that while certain fabrication techniques for the directional modulation layer have been described herein, each with respect to a respective embodiment, such techniques are also applicable to use in other embodiments using the same form of directional modulation layer and/or fabrication sequence. Thus by way of example, the use of UV curable polycarbonate polymer or the embossing to form a specific embodiment is exemplary, and such techniques and the sequence of operations for forming the resulting ROE are exemplary only, and the use of UV curable polycarbonate polymer or embossing may be used to form any ROE based directional modulation layer and to fabricate the non-telecentric emissive micro-pixel array light modulator of the present invention in any sequence of fabrication operations. Further, unless the context dictates otherwise, references to a pixel group or pixel groups includes a reference to a group that encompasses the entire SSL imager emitter area.

Thus those skilled in the art will readily appreciate that various modifications and changes can be applied to the embodiments of the invention without departing from its scope defined in and by the appended claims. It should be appreciated that the foregoing examples of the invention are illustrative only, and that the invention can be embodied in other specific forms without departing from the spirit or essential characteristics thereof. The disclosed embodiments, therefore, should not be considered to be restrictive in any sense. The scope of the invention is indicated by the appended claims, rather than the preceding description, and all variations which fall within the meaning and range of equivalents thereof are intended to be embraced therein.

What is claimed is:

1. A non-telecentric emissive micro-pixel array light modulator comprising:
a control layer;
pixelated, multiple color emission III/V semiconductor layers stacked above the control layer and controllable from the control layer to emit at least partially collimated, pixelated light that is modulated chromatically and temporally; and
a directional modulation layer of optical elements above the pixelated multiple color emission III/V semiconductor layers, each optical element to directionally modulate light coupled onto it from a corresponding pixel to a respective direction relative to an axis perpendicular to the pixelated, multiple color emission III/V semiconductor layers;
wherein the directional modulation layer is comprised of pixel level refractive micro optical elements in the form of de-centered micro lenses of successive layers of dielectric materials with different indexes of refraction.

2. The non-telecentric emissive micro-pixel array light modulator of claim 1 further comprising a cover glass layer over the directional modulation layer.

3. The non-telecentric emissive micro-pixel array light modulator of claim 2 wherein the cover glass layer is spaced apart from the directional modulation layer to provide an air gap between the directional modulation layer and the cover glass layer.

4. The non-telecentric emissive micro-pixel array light modulator of claim 1 wherein the dielectric materials are semiconductor dielectric materials.

5. The non-telecentric emissive micro-pixel array light modulator of claim 4 wherein the semiconductor dielectric materials are of silicon oxide or silicon nitride.

6. The non-telecentric emissive micro-pixel array light modulator of claim 1 wherein the directional modulation layer comprises a UV curable polymer.

7. The non-telecentric emissive micro-pixel array light modulator of claim 1 wherein the pixelated, multiple color emission III/V semiconductor layers are divided into groups, each comprising a plurality of pixels.

8. The non-telecentric emissive micro-pixel array light modulator of claim 7 wherein each group of pixels is organized into a square, rectangle or hexagonal pattern.

9. The non-telecentric emissive micro-pixel array light modulator of claim 7 wherein the directional modulation layer comprises patterns, each directional modulation layer pattern corresponding to a respective pixel pattern, each directional modulation layer having the same directional modulation pattern.

10. The non-telecentric emissive micro-pixel array light modulator of claim 7 wherein the directional modulation layer comprises patterns, each directional modulation layer pattern corresponding to a respective pixel pattern, each directional modulation layer having a unique directional modulation pattern.

11. The non-telecentric emissive micro-pixel array light modulator of claim 7 wherein each directional modulation layer pattern directionally modulates light coupled onto it to a respective converging pattern.

12. The non-telecentric emissive micro-pixel array light modulator of claim 7 wherein each directional modulation layer pattern directionally modulates light coupled onto it to a respective diverging pattern.

13. The non-telecentric emissive micro-pixel array light modulator of claim 1 wherein the directional modulation layer directionally modulates light coupled onto it to a respective diverging pattern.

14. The non-telecentric emissive micro-pixel array light modulator of claim 1 wherein the directional modulation layer directionally modulates light coupled onto it to a respective converging pattern.

15. A non-telecentric emissive micro-pixel array light modulator comprising:
a control layer;
pixelated, multiple color emission III/V semiconductor layers stacked above the control layer and controllable from the control layer to emit at least partially collimated, pixelated light that is modulated chromatically and temporally; and
a directional modulation layer of optical elements above the pixelated multiple color emission III/V semiconductor layers, each optical element to directionally modulate light coupled onto it from a corresponding pixel to a respective direction relative to an axis perpendicular to the pixelated, multiple color emission III/V semiconductor layers;
wherein the directional modulation layer is comprised of pixel level refractive micro optical elements in the form of tilted micro lenses of successive layers of dielectric materials with different indexes of refraction.

16. A non-telecentric emissive micro-pixel array light modulator comprising:
a control layer;
pixelated, multiple color emission III/V semiconductor layers stacked above the control layer and controllable from the control layer to emit at least partially collimated, pixelated light that is modulated chromatically and temporally; and
a directional modulation layer of optical elements above the pixelated multiple color emission III/V semiconductor layers, each optical element to directionally modulate light coupled onto it from a corresponding pixel to a respective direction relative to an axis perpendicular to the pixelated, multiple color emission III/V semiconductor layers;
wherein:
the pixilated light emitted by the pixelated, multiple color emission III/V semiconductor layers is at least partially collimated by a waveguide for each pixel emitting the light from each of the stacked layers of the pixelated, multiple color emission III/V semiconductor layers;
each optical element of the directional modulation layer is a Fourier lens;
centers of each optical element of the directional modulation layer are aligned with a respective pixel of the pixelated, multiple color emission III/V semiconductor layers; and
the position of the waveguides, each with respect to a respective optical element, is spatially modulated to provide a desired directional modulation pattern.

17. The non-telecentric emissive micro-pixel array light modulator of claim 1 wherein the directional modulation layer directionally modulates light coupled onto it from a corresponding pixel to a respective converging direction, and further comprising projection optics positioned to receive converging light from the non-telecentric emissive micro-pixel array light modulator and project the converging light, thereby forming a multicolor projector.

18. The non-telecentric emissive micro-pixel array light modulator of claim 1, together with a waveguide, the non-telecentric emissive micro-pixel array light modulator being coupled to an input aperture of the waveguide, the waveguide also having an output aperture, the non-telecentric emissive micro-pixel array light modulator being positioned on the waveguide and the directional modulation layer being selected to direct an image from the pixelated multiple color emission III/V semiconductor layers into the input aperture, to be reflected by total internal reflection before exiting the waveguide through the output aperture of the waveguide.

19. The non-telecentric emissive micro-pixel array light modulator of claim 1, together with a tapered waveguide, the non-telecentric emissive micro-pixel array light modulator being coupled to an input aperture of the tapered waveguide in a region of the tapered waveguide of a first thickness, the tapered waveguide also having an output aperture in a region of the tapered waveguide of a second thickness, the second thickness being less than the first thickness, the non-telecentric emissive micro-pixel array light modulator being positioned on the tapered waveguide and the directional modulation layer being selected to direct an image from the pixelated multiple color emission III/V semiconductor layers to be reflected by at least a first internal surface of the tapered waveguide by total internal reflection before exiting the tapered waveguide through the output aperture of the tapered waveguide as a result of the breaking of the total internal reflection caused by the taper of the tapered waveguide.

\* \* \* \* \*